(12) United States Patent
Koike et al.

(10) Patent No.: US 12,552,948 B2
(45) Date of Patent: Feb. 17, 2026

(54) RADIATION CURABLE INK JET INK COMPOSITION AND INK JET METHOD

(71) Applicant: Seiko Epson Corporation, Toyko (JP)

(72) Inventors: Naoki Koike, Matsumoto (JP); Toru Saito, Yamagata (JP); Toshiyuki Yoda, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 1067 days.

(21) Appl. No.: 17/355,269

(22) Filed: Jun. 23, 2021

(65) Prior Publication Data

US 2021/0403732 A1    Dec. 30, 2021

(30) Foreign Application Priority Data

Jun. 24, 2020  (JP) ................................ 2020-108575

(51) Int. Cl.
| | |
|---|---|
| *C09D 11/101* | (2014.01) |
| *B41J 11/00* | (2006.01) |
| *C08F 222/10* | (2006.01) |
| *C08F 226/06* | (2006.01) |
| *C09D 11/106* | (2014.01) |
| *C09D 11/322* | (2014.01) |
| *C09K 11/06* | (2006.01) |

(52) U.S. Cl.
CPC ......... *C09D 11/101* (2013.01); *B41J 11/0021* (2021.01); *C08F 222/102* (2020.02); *C08F 226/06* (2013.01); *C09D 11/106* (2013.01); *C09D 11/322* (2013.01); *C09K 11/06* (2013.01); *C09K 2211/1018* (2013.01)

(58) Field of Classification Search
CPC ... C09D 11/101; C09D 11/106; C09D 11/322; C09D 4/00; C09D 11/30; C09D 11/38; B41J 11/0021; C08F 222/102; C08F 226/06; C09K 11/06; C09K 2211/1018
See application file for complete search history.

(56) References Cited

U.S. PATENT DOCUMENTS

| | | | |
|---|---|---|---|
| 2013/0310517 A1* | 11/2013 | Lee ...................... | C09D 11/107 524/789 |
| 2014/0069294 A1 | 3/2014 | Okamoto et al. | |
| 2014/0171537 A1* | 6/2014 | Vanbesien .............. | C09D 11/34 522/100 |
| 2019/0092957 A1* | 3/2019 | Nakano .................. | C09D 11/54 |
| 2020/0062983 A1* | 2/2020 | Runacre .............. | C09D 11/101 |
| 2021/0229466 A1* | 7/2021 | Cederström ......... | B41M 5/0047 |

FOREIGN PATENT DOCUMENTS

| | | | |
|---|---|---|---|
| JP | 2014-055198 A | | 3/2014 |
| JP | 2019081867 A | * | 5/2019 |
| WO | 2018/197852 A1 | | 11/2018 |

OTHER PUBLICATIONS

English machine translation of JP-2019081867-A (Year: 2019).*
"1,4-Bis(Vinyloxy)-Butane." Chemical Book, www.chemicalbook.com/ChemicalProductProperty_US_CB6766843.aspx. (Year: 2025).*

* cited by examiner

*Primary Examiner* — Amber R Orlando
*Assistant Examiner* — Jeffrey Eugene Barzach
(74) *Attorney, Agent, or Firm* — Harness, Dickey & Pierce, P.L.C.

(57) ABSTRACT

A radiation curable ink jet ink composition includes vinyl methyl oxazolidinone; and a monomer having at least two vinyl ether groups.

8 Claims, 1 Drawing Sheet

RADIATION CURABLE INK JET INK COMPOSITION AND INK JET METHOD

The present application is based on, and claims priority from JP Application Serial Number 2020-108575, filed Jun. 24, 2020, the disclosure of which is hereby incorporated by reference herein in its entirety.

BACKGROUND

1. Technical Field

The present disclosure relates to a radiation curable ink jet ink composition and an ink jet method.

2. Related Art

Heretofore, a radiation curable ink jet ink composition containing a monomer, such as 2-(2-vinyloxyethoxy)ethyl acrylate or a divinyl ether-based compound, has been known. Since having a low viscosity as compared to that of each of other radiation curable monomers, the monomer described above contributes to a decrease in viscosity of the above ink composition, so that an ejection property thereof from an ink jet head is improved. For example, JP-A-2014-55198 has disclosed an active energy curable ink jet ink composition containing 2-(2-vinyloxyethoxy)ethyl acrylate and triethylene glycol divinyl ether as the divinyl ether-based compound.

However, in the active energy curable ink jet ink composition disclosed in the above patent document, there has been a problem in that while the viscosity thereof is decreased, an adhesive property of a curd coating film is difficult to improve. In particular, since a monomer, such as dipropylene glycol diacrylate, having a relatively high viscosity is also used together in combination, the viscosity is liable to be increased. In addition, 2-(2-vinyloxyethoxy) ethyl acrylate and the divinyl ether-based compound each have a plurality of functional groups. Hence, compared to a monofunctional monomer, the adhesive property between a coating film and a recording medium is difficult to secure. That is, a radiation curable ink jet ink composition is desired to have a low viscosity and to form a coating film having an excellent adhesive property.

SUMMARY

According to an aspect of the present disclosure, there is provided a radiation curable ink jet ink composition comprising: vinyl methyl oxazolidinone; and a monomer having at least two vinyl ether groups.

According to another aspect of the present disclosure, there is provided an ink jet method comprising: a step of ejecting the radiation curable ink jet ink composition described above from an ink jet head to be adhered to a recording medium; and a step of emitting radiation rays to the radiation curable ink jet ink composition adhered to the recording medium.

DESCRIPTION OF EXEMPLARY EMBODIMENTS

Figure 1:
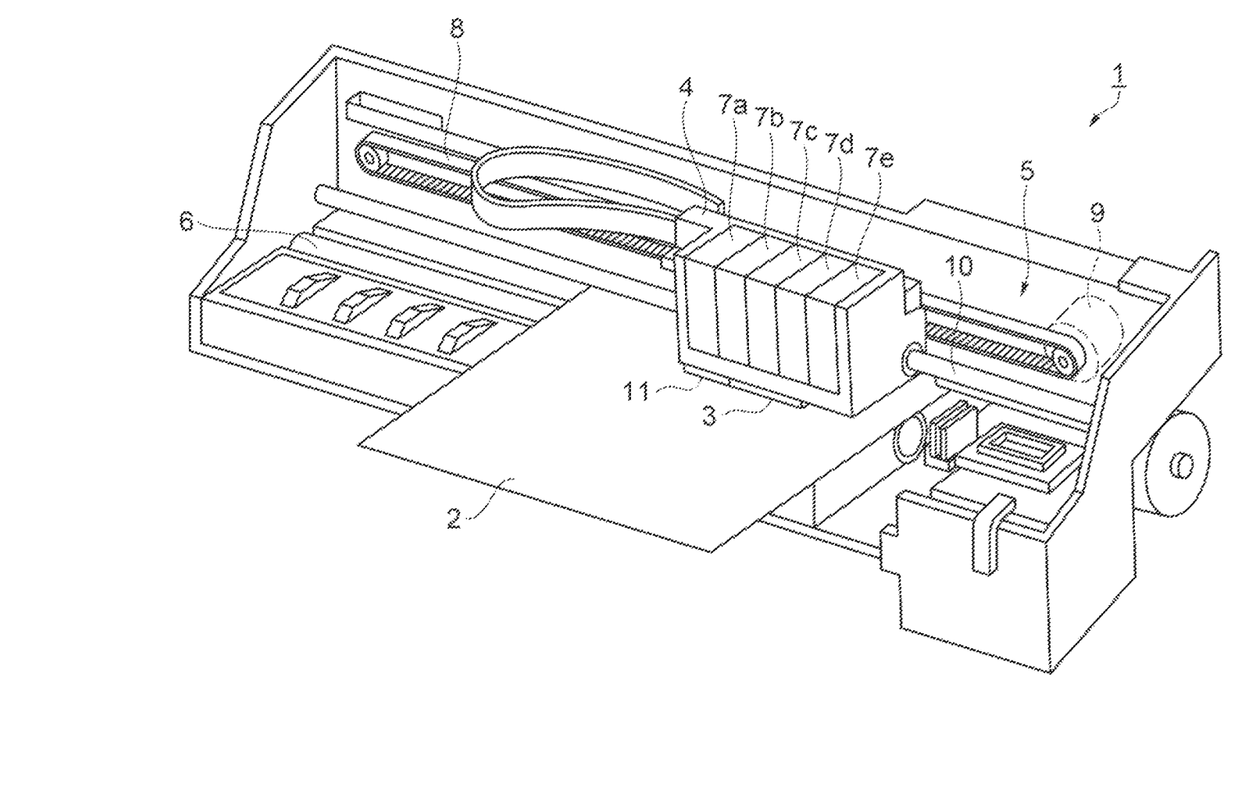
FIGURE is a schematic perspective view showing the structure of an ink jet printer according to an embodiment.

1. Radiation Curable Ink Jet Ink Composition

A radiation curable ink jet ink composition according to this embodiment includes, for example, a polymerizable compound, a photopolymerization initiator, a colorant, and various types of additives. The radiation curable ink jet ink composition according to this embodiment may be applied, for example, to printing and 3D modeling of signage and the like using an ink jet method which will be described later. In the following description, the radiation curable ink jet ink composition according to this embodiment is also simply called the ink in some cases. Hereinafter, various types of components contained in the ink will be described.

1.1. Polymerizable Compound

The polymerizable compound has at least one polymerizable function. In general, the polymerizable compound includes a monofunctional monomer having one functional group and a polyfunctional monomer having a plurality of functional groups. The following polymerizable compounds of this embodiment may be used alone, or at least two types thereof may be used in combination.

When being irradiated with radiation rays, the polymerizable compound used in this embodiment is cured by a polymerization reaction of the functional group. Accordingly, a coating film is formed from the ink. As the radiation rays, for example, ultraviolet rays, electron rays, infrared rays, visible light rays, and x-rays may be mentioned. Among those rays mentioned above, since a material having a preferable curing property at a peak wavelength of radiation rays and a radiation source therefor are easily available, ultraviolet rays are preferably used as the radiation rays.

The ink of this embodiment contains, as the polymerizable compound, vinyl methyl oxazolidinone (CAS No: 3395-98-0) and a monomer having at least two vinyl ether groups. In addition, the ink may further contain, as the polymerizable compound, a monomer represented by the following formula (1) and a monofunctional (meth)acrylate monomer. In this embodiment, the monomer having at least two vinyl ether groups is also called a monomer having a plurality of vinyl ether groups, and the monomer represented by the formula (1) is also called a monomer of the formula (1).

$$H_2C=CR^1-CO-OR^2-O-CH=CH-R^3 \quad (1)$$

In the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

When the functional group of the polymerizable compound is a (meth)acryloyl group, in view of a curing property of the ink, an acryloyl group is preferable. In addition, in this specification, (meth)acryloyl indicates at least one of acryloyl and (meth)acryloyl corresponding thereto, (meth)acrylate indicates at least one of acrylate and methacrylate corresponding thereto, and (meth)acryl indicates at least one of acryl and methacryl corresponding thereto.

1.1.1. Vinyl Methyl Oxazolidinone

Vinyl methyl oxazolidinone is a nitrogen-containing monofunctional monomer having a vinyl group as the functional group. Since vinyl methyl oxazolidinone has a relatively low viscosity although being a monofunctional monomer, vinyl methyl oxazolidinone contributes to a decrease in viscosity of the ink. In addition, vinyl methyl oxazolidinone improves an adhesive property between a coating film and a recording medium and an abrasion resistance of the coating film. In addition, when vinyl methyl oxazolidinone and a monofunctional (meth)acrylate monomer which will be described later are used in combination, a stretching property of the coating film is improved.

A content of vinyl methyl oxazolidinone in the ink with respect to the total mass of the ink is preferably 5 to 40 percent by mass, more preferably 10 to 35 percent by mass, and further preferably 15 to 30 percent by mass. Since the content described above is equal to or more than the above lower value, the viscosity of the ink can be further decreased, and in addition, the adhesive property and the abrasion resistance of the coating film can also be further improved. Since the content described above is lower than or equal to the above upper value, a storage stability of the ink can be improved.

1.1.2. Monomer Having Plurality of Vinyl Ether Groups

The monomer having at least two vinyl ether groups is a polyfunctional monomer having a plurality of vinyl ether groups as the functional group. As the monomer having a plurality of vinyl ether groups, for example, there may be mentioned a divinyl ether-based compound, such as ethylene glycol divinyl ether, butylene glycol divinyl ether, hexanediol divinyl ether, propylene glycol divinyl ether, diethylene glycol divinyl ether, triethylene glycol divinyl ether, dipropylene glycol divinyl ether, tripropylene glycol divinyl ether, or 1,4-cyclohexanedimethanol divinyl ether; a trivinyl ether compound, such as trimethylolethane trivinyl ether, trimethylolpropane trivinyl ether, or glycerin trivinyl ether; a tetravinyl ether compound, such as ditrimethylolpropane tetravinyl ether or pentaerythritol tetravinyl ether; or dipentaerythritol pentavinyl ether. Those monomers each have a relatively low viscosity as compared to that of a general monofunctional monomer and each contribute to a decrease in viscosity of the ink.

Among those mentioned above, in view of the decrease in viscosity and the curing property of the ink, diethylene glycol divinyl ether or 1,4-cyclohexanedimethanol divinyl ether is preferable, and triethylene glycol divinyl ether is more preferable.

A content of the monomer having a plurality of vinyl ether groups in the ink with respect to the total mass of the ink is preferably 5 to 30 percent by mass, more preferably 10 to 25 percent by mass, and further preferably 15 to 20 percent by mass. Since the content described above is equal to or more than the above lower value, the viscosity of the ink can be further decreased. Since the content described above is equal to or less than the above upper value, the curing property of the ink by radiation irradiation can be improved. The improvement in curing property of the ink contributes to an increase in formation rate of the coating film, and hence a time necessary for manufacturing of a printed matter including the coating film can be shortened.

1.1.3. Monomer of Formula (1)

The monomer of the formula (1) has, as the functional group, one (meth)acryloyl group and one functional group, such as a vinyl ether group, having an unsaturated double bond between carbon atoms. In the formula (1), as the divalent organic residue having 2 to 20 carbon atoms represented by $R^2$, for example, there may be mentioned a linear, a branched, or a cyclic substituted or unsubstituted alkylene group having 2 to 20 carbon atoms, a substituted or unsubstituted alkylene group having 2 to 20 carbon atoms and at least one of an ether bond and an ester bond in its structure, or a substituted or unsubstituted divalent aromatic group having 6 to 11 carbon atoms.

Among those mentioned above, an alkylene group, such as an ethylene group, an n-propylene group, an isopropylene group, or a butylene group, having 2 to 6 carbon atoms or an alkylene group, such as an oxyethylene group, an oxy n-propylene group, an oxyisopropylene group, or an oxybutylene group, having 2 to 9 carbon atoms and an oxygen atom derived from an ether bond in its structure is preferable. Furthermore, in view of the decrease in viscosity of the ink and the improvement in curing property of the ink, as $R^2$, an alkylene group, such as an oxyethylene group, an oxy n-propylene group, an oxyisopropylene group, or an oxybutylene group, having 2 to 9 carbon atoms and an oxygen atom derived from an ether bond in its structure, that is, a group having a glycol ether chain, is more preferable.

In the formula (1), as the monovalent organic residue having 1 to 11 carbon atoms represented by $R^3$, for example, there may be mentioned a linear, a branched, or a cyclic substituted or unsubstituted alkyl group having 1 to 10 carbon atoms or a substituted or unsubstituted aromatic group having 6 to 11 carbon atoms. Among those mentioned above, an alkyl group, such as a methyl group or an ethyl group, having 1 to 2 carbon atoms or an aromatic group, such as a phenyl group or a benzyl group, having 6 to 8 carbon atoms is preferable.

When the organic residue described above may be a substituted group, a substituent thereof is classified into a group containing at least one carbon atom and a group containing no carbon atoms. When the substituent is a group containing at least one carbon atom, the number of carbon atoms thereof is included in the number of carbon atoms of the organic residue. Although the group containing at least one carbon atom is not particularly limited, for example, a carboxy group or an alkoxy group may be mentioned. Although the group containing no carbon atoms is not particularly limited, for example, there may be mentioned a hydroxy group or a halo group.

As a particular example of the monomer of the formula (1), for example, there may be mentioned 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(2-vinyloxyethoxy)ethyl acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxethoxyethoxyethoxy)ethyl (meth)acrylate, 2-(vinyloxethoxyethoxyethoxyethoxy)ethyl (meth)acrylate, 2-(isopropenoxyethoxy)ethyl (meth)acrylate, 2-(isoprenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, a polyethylene glycol monovinyl ether (meth)acrylate, or a polypropylene glycol monovinyl ether (meth)acrylate. Among those particular examples described above, since the balance between the curing property and the viscosity of the ink is likely to be obtained, 2-(2-vinyloxyethoxy)ethyl acrylate is particularly preferable.

The monomer of the formula (1) has a relatively low viscosity as compared to that of a general monofunctional monomer and contributes to the decrease in viscosity of the ink. In addition, the curing property by radiation irradiation is also excellent. Accordingly, the viscosity of the ink can be further decreased, and in addition, when the coating film is formed therefrom, the curing property of the ink can also be improved.

A content of the monomer of the formula (1) in the ink with respect to the total mass of the ink is preferably 10 to 50 percent by mass, more preferably 20 to 45 percent by mass, and further preferably 30 to 40 percent by mass. Since the content described above is equal to or more than the above lower value, the viscosity of the ink can be further decreased, and in addition, the curing property of the ink by radiation irradiation can also be further improved. Since the content described above is equal to or less than the above upper value, an odor of the ink can be decreased, and in addition, the adhesive property between the coating film and the recording medium is also improved.

1.1.4. Monofunctional (meth)acrylate Monomer

The monofunctional (meth)acrylate monomer has, as the functional group, one (meth)acryloyl group. Since the monofunctional (meth)acrylate monomer is used for the ink, a cross-linking density of the coating film is suppressed, and hence the stretching property of the coating film can be improved.

As the monofunctional (meth)acrylate monomer, for example, there may be mentioned a monofunctional (meth)acrylate monomer having an aromatic group, a monofunctional (meth)acrylate monomer having an alicyclic structure, a monofunctional (meth)acrylate monomer having a cyclic ether structure, or a monofunctional (meth)acrylate monomer having a cross-linked condensed ring structure.

Among those mentioned above, the ink preferably contains, as the monofunctional (meth)acrylate monomer, the monofunctional (meth)acrylate monomer having an aromatic group. The monofunctional (meth)acrylate monomer having an aromatic group is excellent in solubility of a photopolymerization initiator, such as an acylphosphine oxide-based photopolymerization initiator. Hence, when the photopolymerization initiator described above is used together in combination, the curing property of the ink by radiation irradiation can be improved.

As the monofunctional (meth)acrylate monomer having an aromatic group, for example, there may be mentioned phenoxyethyl (meth)acrylate, benzyl (meth)acrylate, an alkoxylated 2-phenoxyethyl (meth)acrylate, ethoxylated nonylphenyl (meth)acrylate, an alkoxylated nonylphenyl (meth)acrylate, a p-cumylphenol EO-modified (meth)acrylate, or 2-hydroxy-3-phenoxypropyl (meth)acrylate.

Among those mentioned above, in view of the solubility of the photopolymerization initiator described above, benzyl (meth)acrylate or phenoxyethyl (meth)acrylate is preferable, phenoxyethyl (meth)acrylate is more preferable, and phenoxyethyl ethyl acrylate (2-phenoxyethyl acrylate) is further preferable.

A content of the monofunctional (meth)acrylate monomer having an aromatic group in the ink with respect to the total mass of the ink is 5 to 40 percent by mass, more preferably 10 to 35 percent by mass, and further preferably 15 to 30 percent by mass. Accordingly, the solubility of the photopolymerization initiator having an aromatic group is further improved. In addition, the stretching property of the coating film is improved, and in addition, the curing property of the ink and the adhesive property and the abrasion resistance of the coating film are also improved.

As the monofunctional (meth)acrylate monomer having an alicyclic structure, for example, there may be mentioned isobornyl (meth)acrylate, 4-tert-butylcyclohexyl (meth)acrylate, 2-(meth)acrylic acid-1,4-dioxaspiro[4,5]dec-2-yl-methyl, dicyclopentanyl acrylate, or 3,3,5-trimethylcyclohexyl acrylate.

Among those mentioned above, in view of the curing property of the ink and the abrasion resistance of the coating film, isobornyl acrylate or 3,3,5-trimethylcyclohexyl acrylate is preferable.

As the monofunctional (meth)acrylate monomer having a cyclic ether structure, for example, cyclic trimethylolpropane formal acrylate, tetrahydrofurfuryl acrylate, or (2-methyl-2-ethyl-1,3-dioxasolane-4-yl)methyl acrylate may be mentioned. When at least one of those monomers is used together in combination with vinyl methyl oxazolidinone for the ink, the odor of the ink can be suppressed, and in addition, the adhesive property and the abrasion resistance of the coating film are also improved.

The cross-linked condensed ring structure of the monofunctional (meth)acrylate monomer having a cross-linked condensed ring structure indicates a structure in which at least two cyclic structures collectively form at least one side by condensation therebetween and in which at least two atoms not adjacent to each other in the same ring structure or different ring structures are bonded to each other. As the monofunctional (meth)acrylate monomer having a cross-linked condensed ring structure, for example, dicyclopentenyl (meth)acrylate, dicyclopentenyloxy ethyl (meth)acrylate, or dicycicopentanyl (meth)acrylate may be mentioned. In addition, a monofunctional (meth)acrylate having a cross-linked condensed ring structure represented by the following formula (a) or (b) may also be used. When at least one of the monofunctional (meth)acrylate monomers having a cross-linked condensed ring structure is used together in combination with vinyl methyl oxazolidinone, the abrasion resistance and the stretching property of the coating film are improved, and the adhesive property thereof to a recording medium is further improved.

[Chem.1]

(a)

[Chem. 2]

(b)

A content of the monofunctional (meth)acrylate monomer having an alicyclic structure, a cyclic ether structure, or a cross-linked condensed ring structure with respect to the total mass of the ink is preferably 5 to 40 percent by mass, more preferably 10 to 35 percent by mass, and further preferably 15 to 30 percent by mass. Accordingly, the stretching property of the coating film is further improved, and in addition, the curing property of the ink and the adhesive property and the abrasion resistance of the coating film are also improved.

The monofunctional (meth)acrylate monomers mentioned above may be used alone, or at least two types thereof may be used in combination.

As another monofunctional (meth)acrylate monomer, for example, there may be mentioned a (meth)acrylate having a linear or branched aliphatic group, such as 2-ethylhexyl acrylate, isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxyethyl (meth)acrylate, 2-hydroxypropyl (meth)acrylate, 2-hydroxybutyl (meth)acrylate, butoxyethyl (meth)acrylate, or a tetrahydrofurfuryl (meth)acrylate; or a lactone-modified flexible (meth)acrylate.

1.1.5. Other Polymerizable Compounds

As other polymerizable compounds other than the polymerizable compounds described above, the ink may also contain the following monofunctional monomer, polyfunctional monomer, and oligomer. As functional groups of the other polymerizable compounds are not particularly limited as long as a polymerization reaction can be performed by radiation rays, and known polymerizable functional groups may be used.

As the monofunctional monomer, for example, there may be mentioned a nitrogen-containing monofunctional vinyl monomer, such as N-vinylcaprolactam, N-vinylformamide, N-vinylcarbazole, N-vinylacetamide, or N-vinylpyrrolidone; a nitrogen-containing monofunctional acrylate monomer such as acryloylmorpholine; a nitrogen-containing monofunctional acrylamide monomer, such as (meth)acrylamide, N-hydroxymethyl (meth)acrylamide, diacetone acrylamide, N,N-dimethyl (meth)acrylamide, or dimethylaminoethyl acrylate benzyl chloride quaternary salt; an unsaturated carboxylic acid, such as (meth)acrylic acid, itaconic acid, crotonic acid, isocrotonic acid, or maleic acid; a salt of the unsaturated carboxylic acid; an ester, an urethane, an amide, or an anhydride of an unsaturated carboxylic acid; an acrylonitrile; a styrene; or various types of unsaturated polyesters, unsaturated polyethers, unsaturated polyamides, or unsaturated urethanes. In addition, although being classified in the nitrogen-containing monofunctional vinyl monomer, vinyl methyl oxazolidinone is not included therein in this specification.

As the polyfunctional monomer, for example, there may be mentioned a difunctional (meth)acrylate, such as dipropylene glycol di(meth)acrylate, diethylene glycol di(meth)acrylate, triethylene glycol di(meth)acrylate, tetraethylene glycol di(meth)acrylate, a polyethylene glycol di(meth)acrylate, dipropylene glycol di(meth)acrylate, tripropylene glycol di(meth)acrylate, a polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, propoxylated (2) neopentyl glycol di(meth)acrylate, dimethylol tricyclodecane di(meth)acrylate, di(meth)acrylate of an EO (ethylene oxide) adduct of bisphenol A, di(meth)acrylate of a PO (propylene oxide) adduct of bisphenol A, hydroxypivalic acid neopentyl glycol di(meth)acrylate, or a polytetramethylene glycol di(meth)acrylate; or a polyfunctional (meth)acrylate monomer having at least three functional groups, such as trimethylolpropane tri(meth)acrylate, an EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritol ethoxy tetra(meth)acrylate, or caprolactam-modified dipentaerythritol hexa(meth)acrylate. Among those mentioned above, tripropylene glycol diacrylate or propoxylated (2) neopentyl glycol di(meth)acrylate is preferable.

A content of the polyfunctional monomer in the ink with respect to the total mass of the ink is preferably 2 to 20 percent by mass, more preferably 2 to 15 percent by mass, and further preferably 2 to 10 percent by mass. Accordingly, the curing property of the ink is improved.

The oligomer is a multimer containing at least one polymerizable compound functioning as a constituent component and is a compound having at least one functional group. In addition, the polymerizable compound in this case is not limited to the polymerizable compound described above. In this specification, a polymerizable compound having a molecular weight of 1,000 or less is regarded as the monomer, and a polymerizable compound having a molecular weight of more than 1,000 is regarded as the oligomer.

As the oligomer, for example, there may be mentioned an urethane acrylate oligomer having an urethane as a repeating unit, a polyester acrylate oligomer having an ester as a repeating unit, or an epoxy acrylate oligomer derived from a polymerizable compound having an epoxy as a repeating unit may be mentioned.

Among those mentioned above, the urethane acrylate oligomer is preferable. In the urethane acrylate oligomer, an aromatic urethane acrylate oligomer is preferable, and an aliphatic urethane acrylate oligomer is more preferable. In addition, the number of functional groups of the urethane acrylate oligomer is preferably four or less and more preferably two or less. Accordingly, the increase in viscosity of the ink is suppressed, and in addition, the curing property of the ink and the adhesive property of the coating film are also improved.

A content of the oligomer in the ink with respect to the total mass of the ink is preferably 1 to 15 percent by mass, more preferably 1 to 10 percent by mass, and further preferably 2 to 7 percent by mass. Accordingly, the increase in viscosity of the ink is further suppressed, and in addition, the curing property of the ink and the adhesive property of the coating film are also further improved.

1.2. Photopolymerization Initiator

The photopolymerization initiator generates active species by radiation irradiation and has a function to promote the polymerization reaction of the polymerizable compound by the active species. The active species generated from the photopolymerization initiator are, in particular, radicals, acids, and/or bases.

As long as having the function described above, the photopolymerization initiator is not particularly limited, and for example, there may be mentioned a known photopolymerization initiator, such as an acylphosphine oxide-based photopolymerization initiator, an alkylphenone-based photopolymerization initiator, a titanocene-based photopolymerization initiator, or a thioxanthone-based photopolymerization initiator. Among those mentioned above, the thioxanthone-based photopolymerization initiator is preferable, and the acylphosphine oxide-based photopolymerization initiator is more preferable. Accordingly, the curing property of the ink, in particular, the curing property in a curing process using ultraviolet light-emitting diode (UV-LED) light, is improved. The photopolymerization initiators may be used alone, or at least two types thereof may be used in combination.

As the acylphosphine oxide-based photopolymerization initiator, for example, there may be mentioned 2,4,6-trimethylbenzoyl diphenylphosphine oxide, bis(2,4,6-trimethylbenzoyl)-phenylphosphine oxide, or bis(2,6-dimethoxybenzoyl)-2,4,4-trimethylpentylphosphine oxide.

As the acylphosphine oxide-based photopolymerization initiator, a commercially available product may also be used. As the above commercially available product, for example, there may be mentioned Omnirad (registered trademark) 819 (bis(2,4,6-trimethylbenzoyl)-phenylphosphine oxide), Omnirad 1800 (mixture of bis(2,6-diimethoxybenzoyl)-2,4,4-trimethylpentylphosphine oxide and 1-hydroxy-cyclohexyl-phenyl ketone at a mass ratio of 25:75), or Omnirad TPO (2,4,6-trimethylbenzoyl)-diphenylphosphine oxide) manufactured by IGM RESINS B. V.; or Speedcure (registered trademark) TPO (2,4,6-trimethylbenzoyl)-diphenylphosphine oxide) manufactured by Lambson Group Ltd.

A content of the acylphosphine oxide-based photopolymerization initiator contained in the ink with respect to the total mass of the ink is preferably 3 to 15 percent by mass, more preferably 5 to 12 percent by mass, and further preferably 7 to 10 percent by mass. Accordingly, the curing property of the ink is improved, and in addition, the solubility of the photopolymerization initiator is also secured.

As the thioxanthone-based photopolymerization initiator, for example, there may be mentioned thioxanthone, 2-methyl thioxanthone, 2,4-diethyl thioxanthone, 2-isopropyl thioxanthone, 4-isopropyl thioxanthone, or 2-chloro thioxanthone.

As the thioxanthone-based photopolymerization initiator, a commercially available product may also be used. As the commercially available product, for example, Speedcure (registered trademark) DETX (2,4-diethyol thioxanthone) manufactured by Lambson Group Ltd. may be mentioned.

A content of the thioxanthone-based photopolymerization initiator in the ink with respect to the total mass of the ink is preferably 0.5 to 10 percent by mass and more preferably 1 to 3 percent by mass. Accordingly, the curing property of the ink is improved.

1.3. Colorant

The colorant colors a coating film formed from the ink. Since the coating film of the ink is colored, coloration of a recording medium and color image formation on the recording medium can be performed. As the colorant, a pigment or a dye may be used. In addition, the ink of the present disclosure is not limited to an ink containing a colorant and may also be a clear ink containing no colorants.

1.3.1. Pigment

The pigment improves a light resistance of the coating film of the ink. As the pigment, either an inorganic pigment or an organic pigment may be used.

As the pigment, either a known organic pigment or a known inorganic pigment may be used. As the organic pigment, for example, there may be mentioned an azo pigment, such as an azo lake pigment, an insoluble azo pigment, a condensed azo pigment, or a chelate azo pigment; a polycyclic pigment, such as a phthalocyanine pigment, a perylene pigment, a perinone pigment, an anthraquinone pigment, a quinacridone pigment, a dioxazine pigment, a thioindigo pigment, an isoindolinone pigment, an isoindoline pigment, a quinophthalone pigment, or a diketopyrrolopyrrole pigment; a dye lake pigment, such as a basic dye lake or an acidic dye lake; a nitro pigment, a nitroso pigment, an aniline black, or a daylight fluorescent pigment. As the inorganic pigment, for example, there may be mentioned a metal oxide pigment, such as titanium oxide, zinc oxide, or chromium oxide; or a carbon black. In addition, a bright pigment, such as a pearl pigment or a metallic pigment, may also be used.

As a black pigment, C.I. (Colour Index Generic Name) Pigment Black 1, 7, or 11 may be mentioned. Among those mentioned above, C.I. Pigment Black 7, which is a carbon black, is preferably used.

As a particular example of the carbon black, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven (registered trademark) 5750, 5250, 5000, 3500, 1255, or 700 (manufactured by Columbia Carbon Co., Ltd.); Regal (registered trademark) 400R, 330R, or 660R, Mogul (registered trademark) L, Monarch (registered trademark) 700, 800, 880, 900, 1000, 1100, 1300, or 1400 (manufactured by Cabot Corporation); or Color Black FW1, FW2, FW2V, FW18, FW200, 5150, 5160, or 5170, Printex (registered trademark) 35, U, V, or 140U, or Special Black 6, 5, 4A, or 4 (manufactured by Degussa).

As a white pigment, for example, C.I. Pigment White 6, 18, or 21 may be mentioned.

As a yellow pigment, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

As a magenta pigment, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

As a cyan pigment, for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

As a pigment other than those described above, for example, there may be mentioned C.I. Pigment Green 7 or 10, C.I. Pigment Brown 3, 5, 25, or 26, or C.I. Pigment Orange 1, 2, 5, 7, 13, 14, 15, 16, 24, 34, 36, 38, 40, 43, or 63.

The pigments may be used alone, or at least two types thereof may be used in combination. When the pigment is used, a dispersant which will be described later may also be used. In addition, an average particle diameter of the pigment is preferably 300 nm or less and is more preferably 50 to 200 nm. When the average particle diameter of the pigment is in the range described above, for example, an ejection property and a dispersion stability of the ink are improved, and in addition, an image quality of an image of the coating film is improved. In addition, the average particle diameter in this case indicates a volume-basis particle size distribution (50%) measured by a dynamic light scattering method.

A content of the pigment in the ink with respect to the total mass of the ink is 0.2 to 20.0 percent by mass, preferably 1.0 to 20.0 percent by mass, more preferably 1.0 to 15.0 percent by mass, and further preferably 1.0 to 10.0 percent by mass.

1.3.2. Dye

As the dye, a known acidic dye, direct dye, reactive dye, or basic dye may be used. The dyes may be used alone, or at least two types thereof may be used in combination.

As the dye, for example, there may be mentioned C.I. Acid Yellow 17, 23, 42, 44, 79, or 142; C.I. Acid Red 52, 80, 82, 249, 254, or 289; C.I. Acid Blue 9, 45, or 249, C.I. Acid Black 1, 2, 24, or 94; C.I. Food Black 1 or 2; C.I. Direct Yellow 1, 12, 24, 33, 50, 55, 58, 86, 132, 142, 144, or 173; C.I. Direct Red 1, 4, 9, 80, 81, 225, or 227; C.I. Direct Blue 1, 2, 15, 71, 86, 87, 98, 165, 199, or 202; C.I. Direct Black 19, 38, 51, 71, 154, 168, 171, or 195; C.I. Reactive Red 14, 32, 55, 79, or 249; or C.I. Reactive Black 3, 4, or 35.

A content of the dye in the ink with respect to the total mass of the ink is 0.2 to 20.0 percent by mass, preferably 1.0 to 20.0 percent by mass, more preferably 1.0 to 15.0 percent by mass, and further preferably 1.0 to 10.0 percent by mass.

1.4. Additives

The ink preferably contains a fluorescent whitening agent as the additive. In addition, in needed, the ink may also contain other additives, such as a dispersant, a polymerization inhibitor, a surfactant, and a photosensitizer.

1.4.1. Fluorescent Whitening Agent

The fluorescent whitening agent absorbs light having a wavelength of approximately 300 to 450 nm and emits fluorescent light having a wavelength of approximately 400 to 500 nm. That is, when ultraviolet rays are used as radiation rays, the fluorescent whitening agent increases a long wavelength region of ultraviolet rays to be emitted to the ink, so that the curing property of the ink is improved.

As the fluorescent whitening agent, for example, there may be mentioned a naphthalene benzoxazolyl derivative, a thiophene benzoxazolyl derivative, a stilbene benzoxazolyl derivative, a cumarin derivative, a styrene biphenyl derivative, a pyrazolone derivative, a stilbene derivative, stilbene derivatives of benzene and biphenyl, a bis(benzazol-2-yl) derivative, a carbostyril, a naphthalimide, a derivative of dibenzothiophene-5,5'-dioxide, a pyrene derivative, or a pyridotriazole. The fluorescent whitening agents may be used alone, or at least two types thereof may be used in combination.

As the fluorescent whitening agent, a commercially available product may also be used. As the commercially available product, for example, there may be mentioned TELA-LUX (registered trademark) OB (2,5-bis(5-tert-butyl-2-benzoxazolyl)thiophene or KCB (1,4-bis(2-benzoxazolyl) naphthalene) (each manufactured by Clariant (Japan) K.K.).

A content of the fluorescent whitening agent in the ink with respect to the total mass of the ink is preferably 0.07 to 0.70 percent by mass and more preferably 0.10 to 0.50 percent by mass. Accordingly, the curing property of the ink is improved.

1.4.2. Other Additives

The dispersant imparts a dispersing property in the ink to the pigment. Since the dispersant is used, the pigment is stably dispersed in the ink, and, for example, a sedimentation resistance of the ink during storage thereof and an ejection stability from an ink jet head are improved.

As the dispersant, for example, there may be mentioned a known dispersant, such as a polymer dispersant, which is generally used for preparation of a pigment dispersion liquid. As a particular example of the dispersant, for example, there may be mentioned a dispersant containing, as a primary component, at least one selected from the group consisting of a polyoxyalkylene polyalkylene polyamine, a vinyl-based polymer and copolymer, an acrylic-based polymer and copolymer, a polyester, a polyamide, a polyimide, a polyurethane, an amino-based polymer, a silicone-containing polymer, a sulfur-containing polymer, a fluorine-containing polymer, and an epoxy resin. The dispersants may be used alone, or at least two types thereof may be used in combination.

As the polymer dispersant, a commercially available product may also be used. For example, there may be mentioned Ajisper (registered trademark) Series (manufactured by Ajinomoto Fine-Techno Co., Inc.), Solsperse (registered trademark) Series, such as Solsperse 36000, (manufactured by Lubrizol), Disper BYK Series (manufactured by BYK Additives & Instruments), or Disperlon (registered trademark) Series (manufactured by Kusumoto Chemicals, Ltd.).

A content of the dispersant in the ink with respect to the total mass of the ink is preferably 0.05 to 1.00 percent by mass and more preferably 0.10 to 0.50 percent by mass. Accordingly, the storage stability and the ejection stability of the ink are improved.

The polymerization inhibitor suppresses an unintentional polymerization reaction of the polymerizable compound during storage and the like and improves the storage stability of the ink. The polymerization inhibitors may be used alone, or at least two types thereof may be used in combination.

Although the polymerization inhibitor is not particularly limited, for example, there may be mentioned 4-methoxyphenol (hydroquinone monomethyl ether), 4-hydroxy-2,2,6,6-tetramethypyperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis (4-ethyl-6-butylphenol), 4,4'-thiobis(3-methyl-6-t-butylphenol), a hindered amine compound, 2,2,6,6-tetramethylpiperidinyl-1-oxyl, or a derivative thereof.

Among the polymerization inhibitors described above, 2,2,6,6-tetramethylpiperidinyl-1-oxyl or its derivative is preferable. Although the derivative of 2,2,6,6-tetramethylpiperidinyl-1-oxyl is not particularly limited, for example, there may be mentioned 4-acetoamide-2,2,6,6-tetramethylpiperidinyl-1-oxyl, 4-amino-2,2,6,6-tetramethylpiperidinyl-1-oxyl, 4-carboxy-2,2,6,6-tetramethylpiperidinyl-1-oxyl, 4-(2-chloroacetoamide)-2,2,6,6-tetramethylpiperidinyl-1-oxyl, 4-cyano-2,2,6,6-tetramethylpiperidinyl-1-oxyl, 4-hydroxy-2,2,6,6-tetramethylpiperidinyl-1-oxyl, 4-hydroxybenzoate-2,2,6,6-tetramethylpiperidinyl-1-oxyl, 4-(2-iodoaetoamide)-2,2,6,6-tetramethylpiperidinyl-1-oxyl, 4-isothiocyanate-2,2,6,6-tetramethylpiperidinyl-1-oxyl, 4-methacryloyloxy-2,2,6,6-tetramethylpiperidinyl-1-oxyl, 4-methoxy-2,2,6,6-tetramethylpiperidinyl-1-oxyl, 4-oxo-2,2,6,6-tetramethylpiperidinyl-1-oxyl, or 4-(2-propynyloxy)-2,2,6,6-tetramethylpiperidinyl-1-oxyl. Among those mentioned above, 4-hydroxy-2,2,6,6-tetramethylpiperidinyl-1-oxyl is more preferable. When at least one of those mentioned above is used, the storage stability of the ink is further improved.

A content of the polymerization inhibitor in the ink with respect to the total mass of the ink is preferably 0.05 to 1.00 percent by mass and more preferably 0.05 to 0.50 percent by mass.

The surfactant improves the abrasion resistance of the coating film. As the surfactant, for example, there may be mentioned an acetylene glycol-based surfactant, a fluorine-based surfactant, or a silicone-based surfactant. Among those mentioned above, the silicone-based surfactant is preferable, and a polyester-modified silicone surfactant or a polyether-modified silicone surfactant is more preferable. As the surfactant mentioned above, a commercially available product may also be used, and for example, a polyester-modified silicone, such as BYK (registered trademark)-347 or -348, or BYK-UV3500, -3510, or -3530, or a polyether-modified silicone, such as BYK-3570 (each manufactured by BYK Additives & Instruments), may be mentioned. Those surfactants may be used alone, or at least two types thereof may be used in combination.

A content of the surfactant in the ink with respect to the total mass of the ink is preferably 0.1 to 1.0 percent by mass and more preferably 0.2 to 0.8 percent by mass.

When absorbing radiation rays, the photosensitizer is excited to promote the generation of active species from the photopolymerization initiator. As the photosensitizer, for example, there may be mentioned an amine compound, such as an aliphatic amine, an amine containing an aromatic group, piperidine, a reaction product between an epoxy resin and an amine, or triethanolamine triacrylate; an urea compound, such as allylthiourea or o-tolylthiourea; a sulfur compound, such as sodium diethyl dithiophosphate or a soluble salt of an aromatic sulfinic acid; a nitrile compound, such as N,N-diethyl-p-aminobenzonitrile; a phosphorus compound, such as tri-n-butylphosphine or sodium diethyl dithiophosphide; a nitrogen-containing compound, such as Michler's ketone, an N-nitrosohydroxylamine derivative, an oxazolidine compound, a tetrahydro-1,3-oxazdine compound, or a condensed compound of formaldehyde or acetaldehyde with a diamine; or a chloride compound, such as carbon tetrachloride or hexachloroethane. Those compounds may be used alone, or at least two types thereof may be used in combination.

A content of the photosensitizer in the ink with respect to the total mass of the ink is preferably 0.5 to 3.0 percent by mass.

2. Method for Preparing Ink

For preparation of the ink, the components described above are mixed together and are then sufficiently stirred so as to be uniformly mixed with each other. In addition, in an ink preparation process, at least one of an ultrasonic treatment and a heating treatment may be performed on a mixture in which the polymerizable compound is at least partially mixed with the photopolymerization initiator. Accordingly, a dissolved oxygen amount in a prepared ink is decreased, and hence, the ejection stability and/or the storage stability of the ink is improved.

3. Physical Properties of Ink

A viscosity of the ink at 25° C. is preferably 30 mPa·s (millipascal-seconds) or less, more preferably 25 mPa·s or less, further preferably 20 mPa·s or less, and particularly preferably 15 mPa·s or less. Accordingly, the ejection property of the ink from an ink jet head is improved, and generation of flight curving and scattering of ink droplets can be suppressed. In addition, the viscosity of the ink may be measured using a viscoelastic measurement device, Rheometer MCR-301, manufactured by Anton Paar such that while a shear rate is increased from 10 to 1,000 at a setting temperature of 25° C., a viscosity at a shear rate of 200 is read.

A surface tension of the ink at 20° C. is preferably 20 to 40 mN/m. Accordingly, the ink is not likely to wet a nozzle surface of an ink jet head processed by a liquid repellent treatment. Hence, an appropriate amount of the ink is normally ejected from the ink jet head, and hence, the flight curving and the scattering of the ink liquid droplets can be suppressed. In addition, the surface tension of the ink may be measured using an automatic surface tension meter CBVP-Z manufactured by Kyowa Interface Science Co., Ltd. such that when a platinum plate is wetted with the ink in an environment at 20° C., the surface tension thereof is confirmed.

4. Ink Jet Apparatus

As an ink jet apparatus used for an ink jet method of this embodiment which will be described later, a serial type ink jet printer will be described by way of example with reference to FIGURE. In FIGURE, the size of each member is appropriately changed so as to be recognizable, and hence, the scale thereof is made different from the actual value.

An ink jet printer 1 according to this embodiment is a so-called serial type printer. The serial type printer is a printer in which an ink jet head is mounted on a carriage which is transferred in a predetermined direction, and while the ink jet head is transferred in association with the transfer of the carriage, printing is performed. Hereinafter, the ink jet printer 1 is simply called the printer 1 in some cases.

As shown in FIGURE, the printer 1 includes an ink jet head 3, a carriage 4, a main scanning mechanism 5, a platen roller 6, a light source 11, and a control portion (not shown) which controls the entire operation of the printer 1. The carriage 4 mounts the ink jet head 3 and the light source 11 and also detachably mounts ink cartridges 7a, 7b, 7c, 7d, and 7e each functioning as a container in which an ink is received.

The main scanning mechanism 5 includes a timing belt 8 coupled to the carriage 4, a motor 9 to drive the belt 8, and a guide shaft 10. The guide shaft 10 functions as a support member of the carriage 4 and is provided along a main scanning direction which is a scanning direction of the carriage 4. The carriage 4 is driven by the motor 9 with the timing belt 8 interposed therebetween and is configured to be reciprocally transferred along the guide shaft 10. Accordingly, the main scanning mechanism 5 reciprocally transfers the carriage 4 in the main scanning direction.

The platen roller 6 transports a recording medium 2 to which the ink is adhered in a sub-scanning direction orthogonal to the main scanning direction. Hence, the recording medium 2 is transported in the sub-scanning direction approximately coincident with a length direction of the recording medium 2. The carriage 4 can be reciprocally transferred in the main scanning direction approximately coincident with a width direction of the recording medium 2. Hence, the ink jet head 3 and the light source 11 can be scanned relatively with respect to the recording medium 2 in the main scanning direction and the sub-scanning direction.

The ink cartridges 7a, 7b, 7c, 7d, and 7e are independent five ink cartridges. In the ink cartridges 7a, 7b, 7c, 7d, and 7e, color inks containing the colorants and at least one clear ink containing no colorants are received.

For example, color inks having colors, such as black, cyan, magenta, and yellow, and a clear ink are received in the respective ink cartridges 7a, 7b, 7c, 7d, and 7e so as to be used as an ink set. In FIGURE, although the number of the ink cartridges is five, the number thereof is not limited thereto. In addition, the ink cartridge of the clear ink may be omitted, and an ink cartridge for a different color, such as a white ink, may be provided.

At bottom portions of the ink cartridges 7a, 7b, 7c, 7d, and 7e, supply ports (not shown) to supply the inks thus received to the ink jet head 3 are provided.

For members of the ink cartridge 7a to the ink cartridge 7e, for example, materials are used which are not liable to cause evaporation and deterioration of ink components and which are not liable to be deteriorated by the ink components. In this embodiment, as the ink container, although the ink cartridge is described by way of example, the ink container is not limited thereto, and as the ink container, for example, besides the ink cartridge, an ink pack or an ink bottle may also be used.

At a side of the carriage 4 facing the recording medium 2, the ink jet head 3 and the light source 11 are disposed. The ink jet head 3 has a nozzle surface (not shown) at a side facing the recording medium 2. On the nozzle surface, as a liquid repellent film, a polymer film containing a fluorine compound or a silicone compound or an eutectoid plating film containing nickel and a fluorine compound may be formed. In addition, although not being shown in the drawing, in the nozzle surface, nozzle lines each having a plurality of ejection nozzles are disposed for the respective inks. The inks are supplied to the ink jet head 3 from the respective ink cartridges 7a, 7b, 7c, 7d, and 7e and are then ejected in the form of liquid droplets from the ejection nozzles by actuators (not show) in the ink jet head 3. The liquid droplets of the ink thus ejected are landed on and adhered to the recording medium 2.

In the ink jet head 3, as the actuator functioning as a drive device, although a piezoelectric element is used, the actuator is not limited thereto. As the drive device, for example, an electromechanical conversion element which displaces a vibration plate functioning as an actuator by electrostatic absorption or an electrothermal conversion element which ejects an ink in the form of liquid droplets by air bubbles generated by heating may also be used.

The light source 11 is disposed beside the ink jet head 3 in the main scanning direction. The light source 11 is a radiation irradiation device and includes, for example, a light-emitting element, such as an UV-LED, which is not shown. Radiation rays emitted from the light source 11 are not limited to ultraviolet rays and may includes infrared rays, electron rays, visible light rays, x-rays, and the like. In this case, although a lamp may be used as the light source 11 instead of using a light-emitting element, such as a light-emitting diode (LED) or a semiconductor laser (LD), for example, in view of reduction in size and reduction in cost, the light-emitting element is preferably used.

Since the radiation rays are emitted from the light source 11 on the liquid droplets of the ink adhered to the recording medium 2, a photopolymerization reaction of the polymerizable compound in the ink proceeds, and the liquid droplets of the ink are cured, so that the coating film of the ink is formed. Accordingly, coloration of the recording medium 2, formation of images, colors, characters, patterns, and the like on the recording medium 2, and formation of the coating film of the clear ink are performed.

The light source 11 is not limited to be disposed beside the ink jet head 3 in the main scanning direction and may be disposed beside the ink jet head 3 along the sub-scanning direction at a side opposite to a direction in which the recording medium 2 is transported. In addition, the light source 11 is not limited to be disposed at the carriage 4 and may be provided separately therefrom.

In this embodiment, as the ink jet apparatus, although the on-carriage type printer 1 is described by way of example, the ink jet apparatus is not limited thereto. The ink jet apparatus may also be, for example, an off-carriage type printer, such as a large format printer, in which ink containers are not mounted in a carriage. In addition, the ink jet apparatus used in this embodiment is not limited to the serial printer and may also be a line head printer in which an ink jet head is formed to have a width equal to or larger than the width of the recording medium 2 and in which printing is performed without moving the ink jet head.

5. Recording Medium

The recording medium 2 is appropriately selected in accordance with application of a printed matter formed from an ink and a recording medium. Although a material forming the recording medium 2 is not particularly limited, for example, there may be mentioned a plastic, such as a poly(vinyl chloride) (PVC), a poly(ethylene terephthalate), a polypropylene, a polyethylene, a polycarbonate, a cellulose diacetate, a cellulose triacetate, a cellulose propionate, cellulose butyrate, a cellulose acetate butyrate, a cellulose nitrate, a polystyrene, or a poly(vinyl acetate); at least one of those mentioned above which is processed by a surface treatment; or a glass, paper, a metal, or a wood.

As the form of the recording medium 2, for example, a roll shape, a cut sheet, a board, or a cloth may be mentioned.

6. Ink Jet Method

An ink jet method according to this embodiment includes a coating step of ejecting the ink described above from the ink jet head 3 of the printer 1 to be adhered to the recording medium 2 and a curing step of emitting radiation rays to the ink adhered to the recording medium 2.

6.1. Coating Step

The coating step ejects a color ink from the ink jet head 3 of the printer 1 to be adhered to the recording medium 2. In particular, a piezoelectric element is driven, so that the ink filled in a pressure generation chamber of the ink jet head 3 is ejected from an ejection nozzle. The ejection method as described above is also called an ink jet method. In this case, a multipass printing may be performed such that the carriage 4 is reciprocally transferred in the main scanning direction with respect to a predetermined position of the recording medium 2 at least two times. That is, after the transport of the recording medium 2 in the sub-scanning direction is stopped for a predetermined time, the color ink is ejected by the multipass printing, and after the recording medium 2 is transported a short distance, the multipass printing is again performed.

While the ink jet head 3 is transferred relatively with respect to the recording medium 2, the color ink is adhered thereto, so that a liquid layer of the color ink is formed on the recording medium 2 and is to be used as a base of a desired image or the like.

6.2. Curing Step

In the curing step, a coating film is formed from the liquid layer of the ink formed on the recording medium 2. In particular, radiation rays are emitted from the light source 11 with respect to a predetermined position of the recording medium 2. An emission region of the radiation rays with respect to the recording medium 2 may include a region to which the ink is adhered. By the emission of the radiation rays, the photopolymerization reaction of the polymerizable compound in the ink proceeds in the liquid layer of the ink on the recording medium 2, and the ink is cured, so that the coating film is formed.

In addition, when the clear ink is used to form the coating film, before or after the coating step and the curing step of the color ink, the coating step and the curing step of the clear ink may be performed.

According to this embodiment, the following effect can be obtained.

The viscosity of the ink is decreased, and in addition, the adhesion of the coating film formed therefrom can also be improved. That is, an ink which has a low viscosity and which forms a coating film having an excellent adhesive property can be provided.

In the ink jet method, since the viscosity of the ink can be decreased, the ejection property of the ink from the ink jet head 3 can be improved. In addition, a coating film which improves an adhesive property to the recording medium 2 can be formed.

7. Examples and Comparative Examples

Hereinafter, with reference to Examples and Comparative Examples, the effects of the present disclosure will be described in more detail. Compositions and evaluation results of inks of Examples 1 to 34 and Comparative Examples 1 to 4 are shown in Tables 1, 2, and 3. In the columns of the compositions in Tables 1 to 3, the unit of the numerical value represents percent by mass, and a column in which—is shown, that is, a column in which no numerical value is shown, indicates that no component is contained. In Tables 1 to 3, the names of some components are represented by the abbreviations thereof. The abbreviations will be described below. Hereinafter, the inks of Examples 1 to 34 are also collectively called the inks of Examples, the inks of Comparative Examples 1 to 4 are also collectively called the inks of Comparative Examples, and the inks of Examples and Comparative Examples are also collectively called the inks. In addition, the present disclosure is not limited to the following Examples.

7.1. Preparation of Ink

In accordance with the compositions shown in Tables 1 to 3, the inks were prepared. In particular, a pigment functioning as a colorant, a dispersant, and a part of a polymerizable compound were weighed and then charged in a bead mill dispersion tank. Subsequently, after ceramic beads each having a diameter of 1 mm were charged in the tank, a mixture thus prepared was dispersed by a bead mill, so that a pigment dispersion liquid in which the pigment was dispersed in the polymerizable compound was formed.

Besides the above pigment dispersion liquid, components other than those used for the pigment dispersion liquid, that is, the remaining polymerizable compound and additives, such as a photopolymerization initiator and a fluorescent whitening agent, were weighed and charged in a stainless steel-made mixing tank. Subsequently, stirring was performed using a mechanical stirrer, so that a solid component, such as the photopolymerization initiator, was fully dissolved in the polymerizable compound. Next, after the pigment dispersion liquid described above was weighed and charged, stirring was performed for one hour in an environment at approximately 20° C. Subsequently, filtration was performed using a membrane filter having a pore size of 5 µm, so that the inks of Examples and Comparative Examples were prepared.

TABLE 1

| | | EXAMPLE 1 | EXAMPLE 2 | EXAMPLE 3 | EXAMPLE 4 | EXAMPLE 5 |
|---|---|---|---|---|---|---|
| VINYL METHYL OXAZOLIDINONE | VMOX | 20.00 | 40.00 | 45.00 | 5.00 | 3.00 |
| MONOMER HAVING PLURALITY OF VINYL ETHER GROUPS | DVE-2 | — | — | — | — | — |
| | DVE-3 | 15.00 | 15.00 | 15.00 | 15.00 | 15.00 |
| | CHDM-di | — | — | — | — | — |
| MONOMER OF FORMULA (1) | VEEA | 32.00 | 22.00 | 22.00 | 32.00 | 32.00 |
| MONOFUNCTIONAL (METH)ACRYLATE MONOMER HAVING AROMATIC GROUP | PHEA | 20.00 | 10.00 | 5.00 | 35.00 | 37.00 |
| MONOFUNCTIONAL (METH)ACRYLATE MONOMER HAVING ALICYCLIC STRUCTURE | IBXA | — | — | — | — | — |
| | TMCHA | — | — | — | — | — |
| MONOFUNCTIONAL (METH)ACRYLATE MONOMER HAVING CYCLIC ETHER STRUCTURE | CTFA | — | — | — | — | — |
| | MEDOL-10 | — | — | — | — | — |
| MONOFUNCTIONAL (METH)ACRYLATE MONOMER HAVING CROSS-LINKED CONDENSED RING STRUCTURE | FA-512AS | — | — | — | — | — |
| MONOFUNCTIONAL MONOMER OF OTHER POLYMERIZABLE COMPOUNDS | nVC | — | — | — | — | — |
| | ACMO | — | — | — | — | — |
| POLYFUNCTIONAL MONOMER OF OTHER POLYMERIZABLE COMPOUNDS | TPGDA | — | — | — | — | — |
| | NPG(2PO)DA | — | — | — | — | — |
| OLIGOMER OF OTHER POLYMERIZABLE COMPOUNDS | EC6101 | — | — | — | — | — |
| | CN9893 | — | — | — | — | — |
| PHOTOPOLYMERIZATION INITIATOR | Omnirad 819 | 4.00 | 4.00 | 4.00 | 4.00 | 4.00 |
| | SpeedcureTPO | 4.00 | 4.00 | 4.00 | 4.00 | 4.00 |
| | SpeedcureDETX | 2.00 | 2.00 | 2.00 | 2.00 | 2.00 |
| FLUORESCENT WHITENING AGENT | TELALUX OB | 0.10 | 0.10 | 0.10 | 0.10 | 0.10 |
| | TELALUX KCB | — | — | — | — | — |
| POLYMERIZATION INHIBITOR | LA-7RD | 0.02 | 0.02 | 0.02 | 0.02 | 0.02 |
| | MEHQ | 0.18 | 0.18 | 0.18 | 0.18 | 0.18 |

TABLE 1-continued

| | | | | | | |
|---|---|---|---|---|---|---|
| SURFACTANT | BYK-UV3500 | 0.50 | 0.50 | 0.50 | 0.50 | 0.50 |
| PIGMENT | PB-15:3 | 2.00 | 2.00 | 2.00 | 2.00 | 2.00 |
| DISPERSANT | Solsperse36000 | 0.20 | 0.20 | 0.20 | 0.20 | 0.20 |
| TOTAL | | 100.00 | 100.00 | 100.00 | 100.00 | 100.00 |
| EVALUATION RESULT | VISCOSITY | A | A | AA | B | B |
| | ODOR | A | A | A | A | A |
| | CURING PROPERTY | A | A | A | A | A |
| | ADHESIVE PROPERTY | A | A | A | B | C |
| | STORAGE STABILITY | A | B | C | A | A |

| | | EXAMPLE 6 | EXAMPLE 7 | EXAMPLE 8 | EXAMPLE 9 |
|---|---|---|---|---|---|
| VINYL METHYL OXAZOLIDINONE | VMOX | 20.00 | 20.00 | 20.00 | 20.00 |
| MONOMER HAVING PLURALITY OF VINYL ETHER GROUPS | DVE-2 | 15.00 | — | 5.00 | — |
| | DVE-3 | — | — | 5.00 | 30.00 |
| | CHDM-di | — | 15.00 | 5.00 | — |
| MONOMER OF FORMULA (1) | VEEA | 32.00 | 32.00 | 32.00 | 17.00 |
| MONOFUNCTIONAL (METH)ACRYLATE MONOMER HAVING AROMATIC GROUP | PHEA | 20.00 | 20.00 | 20.00 | 20.00 |
| MONOFUNCTIONAL (METH)ACRYLATE MONOMER HAVING ALICYCLIC STRUCTURE | IBXA | — | — | — | — |
| | TMCHA | — | — | — | — |
| MONOFUNCTIONAL (METH)ACRYLATE MONOMER HAVING CYCLIC ETHER STRUCTURE | CTFA | — | — | — | — |
| | MEDOL-10 | — | — | — | — |
| MONOFUNCTIONAL (METH)ACRYLATE MONOMER HAVING CROSS-LINKED CONDENSED RING STRUCTURE | FA-512AS | — | — | — | — |
| MONOFUNCTIONAL MONOMER OF OTHER POLYMERIZABLE COMPOUNDS | nVC | — | — | — | — |
| | ACMO | — | — | — | — |
| POLYFUNCTIONAL MONOMER OF OTHER POLYMERIZABLE COMPOUNDS | TPGDA | — | — | — | — |
| | NPG(2PO)DA | — | — | — | — |
| OLIGOMER OF OTHER POLYMERIZABLE COMPOUNDS | EC6101 | — | — | — | — |
| | CN9893 | — | — | — | — |
| PHOTOPOLYMERIZATION INITIATOR | Omnirad 819 | 4.00 | 4.00 | 4.00 | 4.00 |
| | SpeedcureTPO | 4.00 | 4.00 | 4.00 | 4.00 |
| | SpeedcureDETX | 2.00 | 2.00 | 2.00 | 2.00 |
| FLUORESCENT WHITENING AGENT | TELALUX OB | 0.10 | 0.10 | 0.10 | 0.10 |
| | TELALUX KCB | — | — | — | — |
| POLYMERIZATION INHIBITOR | LA-7RD | 0.02 | 0.02 | 0.02 | 0.02 |
| | MEHQ | 0.18 | 0.18 | 0.18 | 0.18 |
| SURFACTANT | BYK-UV3500 | 0.50 | 0.50 | 0.50 | 0.50 |
| PIGMENT | PB-15:3 | 2.00 | 2.00 | 2.00 | 2.00 |
| DISPERSANT | Solsperse36000 | 0.20 | 0.20 | 0.20 | 0.20 |
| TOTAL | | 100.00 | 100.00 | 100.00 | 100.00 |
| EVALUATION RESULT | VISCOSITY | A | A | A | A |
| | ODOR | A | A | A | A |
| | CURING PROPERTY | A | A | A | B |
| | ADHESIVE PROPERTY | A | A | A | A |
| | STORAGE STABILITY | A | A | A | A |

| | | EXAMPLE 10 | EXAMPLE 11 | EXAMPLE 12 | EXAMPLE 13 |
|---|---|---|---|---|---|
| VINYL METHYL OXAZOLIDINONE | VMOX | 20.00 | 20.00 | 20.00 | 20.00 |
| MONOMER HAVING PLURALITY OF VINYL ETHER GROUPS | DVE-2 | — | — | — | — |
| | DVE-3 | 31.00 | 5.00 | 4.00 | 15.00 |
| | CHDM-di | — | — | — | — |
| MONOMER OF FORMULA (1) | VEEA | 16.00 | 32.00 | 32.00 | 10.00 |
| MONOFUNCTIONAL (METH)ACRYLATE MONOMER HAVING AROMATIC GROUP | PHEA | 20.00 | 20.00 | 20.00 | 32.00 |
| MONOFUNCTIONAL (METH)ACRYLATE MONOMER HAVING ALICYCLIC STRUCTURE | IBXA | — | — | — | — |
| | TMCHA | — | — | — | — |
| MONOFUNCTIONAL (METH)ACRYLATE MONOMER HAVING CYCLIC ETHER STRUCTURE | CTFA | — | — | — | — |
| | MEDOL-10 | — | — | — | — |
| MONOFUNCTIONAL (METH)ACRYLATE MONOMER HAVING CROSS-LINKED CONDENSED RING STRUCTURE | FA-512AS | — | — | — | — |
| MONOFUNCTIONAL MONOMER OF OTHER POLYMERIZABLE COMPOUNDS | nVC | — | — | — | — |
| | ACMO | — | — | — | — |
| POLYFUNCTIONAL MONOMER OF OTHER | TPGDA | — | — | — | — |

TABLE 1-continued

| | | | | | |
|---|---|---|---|---|---|
| POLYMERIZABLE COMPOUNDS | NPG(2PO)DA | — | 10.00 | 11.00 | 10.00 |
| OLIGOMER OF OTHER POLYMERIZABLE COMPOUNDS | EC6101 | — | — | — | — |
| | CN9893 | — | — | — | — |
| PHOTOPOLYMERIZATION INITIATOR | Omnirad 819 | 4.00 | 4.00 | 4.00 | 4.00 |
| | SpeedcureTPO | 4.00 | 4.00 | 4.00 | 4.00 |
| | SpeedcureDETX | 2.00 | 2.00 | 2.00 | 2.00 |
| FLUORESCENT WHITENING AGENT | TELALUX OB | 0.10 | 0.10 | 0.10 | 0.10 |
| | TELALUX KCB | — | — | — | — |
| POLYMERIZATION INHIBITOR | LA-7RD | 0.02 | 0.02 | 0.02 | 0.02 |
| | MEHQ | 0.18 | 0.18 | 0.18 | 0.18 |
| SURFACTANT | BYK-UV3500 | 0.50 | 0.50 | 0.50 | 0.50 |
| PIGMENT | PB-15:3 | 2.00 | 2.00 | 2.00 | 2.00 |
| DISPERSANT | Solsperse36000 | 0.20 | 0.20 | 0.20 | 0.20 |
| TOTAL | | 100.00 | 100.00 | 100.00 | 100.00 |
| EVALUATION RESULT | VISCOSITY | A | C | C | B |
| | ODOR | A | B | C | A |
| | CURING PROPERTY | C | A | A | B |
| | ADHESIVE PROPERTY | A | A | A | A |
| | STORAGE STABILITY | A | A | A | A |

TABLE 2

| | | EXAMPLE 14 | EXAMPLE 15 | EXAMPLE 16 | EXAMPLE 17 | EXAMPLE 18 |
|---|---|---|---|---|---|---|
| VINYL METHYL OXAZOLIDINONE | VMOX | 25.00 | 15.00 | 10.00 | 26.00 | 10.00 |
| MONOMER HAVING PLURALITY OF VINYL ETHER GROUPS | DVE-2 | — | — | — | — | — |
| | DVE-3 | 20.00 | 7.00 | 7.00 | 25.00 | 10.00 |
| | CHDM-di | — | — | — | — | — |
| MONOMER OF FORMULA (1) | VEEA | — | 50.00 | 55.00 | 32.00 | 26.00 |
| MONOFUNCTIONAL (METH)ACRYLATE MONOMER HAVING AROMATIC GROUP | PHEA | 32.00 | 15.00 | 15.00 | 4.00 | 41.00 |
| MONOFUNCTIONAL (METH)ACRYLATE MONOMER HAVING ALICYCLIC STRUCTURE | IBXA | — | — | — | — | — |
| | TMCHA | — | — | — | — | — |
| MONOFUNCTIONAL (METH)ACRYLATE MONOMER HAVING CYCLIC ETHER STRUCTURE | CTFA | — | — | — | — | — |
| | MEDOL-10 | — | — | — | — | — |
| MONOFUNCTIONAL (METH)ACRYLATE MONOMER HAVING CROSS-LINKED CONDENSED RING STRUCTURE | FA-512AS | — | — | — | — | — |
| MONOFUNCTIONAL MONOMER OF OTHER POLYMERIZABLE COMPOUNDS | nVC | — | — | — | — | — |
| | ACMO | — | — | — | — | — |
| POLYFUNCTIONAL MONOMER OF OTHER POLYMERIZABLE COMPOUNDS | TPGDA | — | — | — | — | — |
| | NPG(2PO)DA | 10.00 | — | — | — | — |
| OLIGOMER OF OTHER POLYMERIZABLE COMPOUNDS | EC6101 | — | — | — | — | — |
| | CN9893 | — | — | — | — | — |
| PHOTOPOLYMERIZATION INITIATOR | Omnirad 819 | 4.00 | 4.00 | 4.00 | 4.00 | 4.00 |
| | SpeedcureTPO | 4.00 | 4.00 | 4.00 | 4.00 | 4.00 |
| | SpeedcureDETX | 2.00 | 2.00 | 2.00 | 2.00 | 2.00 |
| FLUORESCENT WHITENING AGENT | TELALUX OB | 0.10 | 0.10 | 0.10 | 0.10 | 0.10 |
| | TELALUX KCB | — | — | — | — | — |
| POLYMERIZATION INHIBITOR | LA-7RD | 0.02 | 0.02 | 0.02 | 0.02 | 0.02 |
| | MEHQ | 0.18 | 0.18 | 0.18 | 0.18 | 0.18 |
| SURFACTANT | BYK-UV3500 | 0.50 | 0.50 | 0.50 | 0.50 | 0.50 |
| PIGMENT | PB-15:3 | 2.00 | 2.00 | 2.00 | 2.00 | 2.00 |
| DISPERSANT | Solsperse36000 | 0.20 | 0.20 | 0.20 | 0.20 | 0.20 |
| TOTAL | | 100.00 | 100.00 | 100.00 | 100.00 | 100.00 |
| EVALUATION RESULT | VISCOSITY | C | A | A | AA | B |
| | ODOR | A | B | C | A | A |
| | CURING PROPERTY | B | A | A | A | A |
| | ADHESIVE PROPERTY | A | A | A | A | A |
| | STORAGE STABILITY | A | A | A | A | A |

| | | EXAMPLE 19 | EXAMPLE 20 | EXAMPLE 21 | EXAMPLE 22 |
|---|---|---|---|---|---|
| VINYL METHYL OXAZOLIDINONE | VMOX | 20.00 | 37.00 | 19.00 | 20.00 |
| MONOMER HAVING PLURALITY OF VINYL ETHER GROUPS | DVE-2 | — | — | — | — |
| | DVE-3 | 15.00 | 15.00 | 15.00 | 15.00 |
| | CHDM-di | — | — | — | — |
| MONOMER OF FORMULA (1) | VEEA | 32.00 | 32.00 | 12.00 | 32.00 |
| MONOFUNCTIONAL (METH)ACRYLATE MONOMER HAVING AROMATIC GROUP | PHEA | — | — | — | — |
| MONOFUNCTIONAL (METH)ACRYLATE | IBXA | 20.00 | 3.00 | 41.00 | — |

TABLE 2-continued

| | | | | | |
|---|---|---|---|---|---|
| MONOMER HAVING ALICYCLIC STRUCTURE | TMCHA | — | — | — | 20.00 |
| MONOFUNCTIONAL (METH)ACRYLATE | CTFA | — | — | — | — |
| MONOMER HAVING CYCLIC ETHER STRUCTURE | MEDOL-10 | — | — | — | — |
| MONOFUNCTIONAL (METH)ACRYLATE MONOMER HAVING CROSS-LINKED CONDENSED RING STRUCTURE | FA-512AS | — | — | — | — |
| MONOFUNCTIONAL MONOMER OF OTHER POLYMERIZABLE COMPOUNDS | nVC | — | — | — | — |
| | ACMO | — | — | — | — |
| POLYFUNCTIONAL MONOMER OF OTHER POLYMERIZABLE COMPOUNDS | TPGDA | — | — | — | — |
| | NPG(2PO)DA | — | — | — | — |
| OLIGOMER OF OTHER POLYMERIZABLE COMPOUNDS | EC6101 | — | — | — | — |
| | CN9893 | — | — | — | — |
| PHOTOPOLYMERIZATION INITIATOR | Omnirad 819 | 4.00 | 4.00 | 4.00 | 4.00 |
| | SpeedcureTPO | 4.00 | 4.00 | 4.00 | 4.00 |
| | SpeedcureDETX | 2.00 | 2.00 | 2.00 | 2.00 |
| FLUORESCENT WHITENING AGENT | TELALUX OB | 0.10 | 0.10 | 0.10 | 0.10 |
| | TELALUX KCB | — | — | — | — |
| POLYMERIZATION INHIBITOR | LA-7RD | 0.02 | 0.02 | 0.02 | 0.02 |
| | MEHQ | 0.18 | 0.18 | 0.18 | 0.18 |
| SURFACTANT | BYK-UV3500 | 0.50 | 0.50 | 0.50 | 0.50 |
| PIGMENT | PB-15:3 | 2.00 | 2.00 | 2.00 | 2.00 |
| DISPERSANT | Solsperse36000 | 0.20 | 0.20 | 0.20 | 0.20 |
| TOTAL | | 100.00 | 100.00 | 100.00 | 100.00 |
| EVALUATION RESULT | VISCOSITY | A | AA | B | A |
| | ODOR | B | B | B | A |
| | CURING PROPERTY | A | A | B | A |
| | ADHESIVE PROPERTY | A | A | A | A |
| | STORAGE STABILITY | A | A | A | A |

| | | EXAMPLE 23 | EXAMPLE 24 | EXAMPLE 25 | EXAMPLE 26 |
|---|---|---|---|---|---|
| VINYL METHYL OXAZOLIDINONE | VMOX | 20.00 | 37.00 | 19.00 | 20.00 |
| MONOMER HAVING PLURALITY OF VINYL ETHER GROUPS | DVE-2 | — | — | — | — |
| | DVE-3 | 15.00 | 15.00 | 15.00 | 15.00 |
| | CHDM-di | — | — | — | — |
| MONOMER OF FORMULA (1) | VEEA | 32.00 | 32.00 | 12.00 | 32.00 |
| MONOFUNCTIONAL (METH)ACRYLATE MONOMER HAVING AROMATIC GROUP | PHEA | — | — | — | — |
| MONOFUNCTIONAL (METH)ACRYLATE MONOMER HAVING ALICYCLIC STRUCTURE | IBXA | — | — | — | — |
| | TMCHA | — | — | — | — |
| MONOFUNCTIONAL (METH)ACRYLATE | CTFA | 20.00 | 3.00 | 41.00 | — |
| MONOMER HAVING CYCLIC ETHER STRUCTURE | MEDOL-10 | — | — | — | 20.00 |
| MONOFUNCTIONAL (METH)ACRYLATE MONOMER HAVING CROSS-LINKED CONDENSED RING STRUCTURE | FA-512AS | — | — | — | — |
| MONOFUNCTIONAL MONOMER OF OTHER POLYMERIZABLE COMPOUNDS | nVC | — | — | — | — |
| | ACMO | — | — | — | — |
| POLYFUNCTIONAL MONOMER OF OTHER POLYMERIZABLE COMPOUNDS | TPGDA | — | — | — | — |
| | NPG(2PO)DA | — | — | — | — |
| OLIGOMER OF OTHER POLYMERIZABLE COMPOUNDS | EC6101 | — | — | — | — |
| | CN9893 | — | — | — | — |
| PHOTOPOLYMERIZATION INITIATOR | Omnirad 819 | 4.00 | 4.00 | 4.00 | 4.00 |
| | SpeedcureTPO | 4.00 | 4.00 | 4.00 | 4.00 |
| | SpeedcureDETX | 2.00 | 2.00 | 2.00 | 2.00 |
| FLUORESCENT WHITENING AGENT | TELALUX OB | 0.10 | 0.10 | 0.10 | 0.10 |
| | TELALUX KCB | — | — | — | — |
| POLYMERIZATION INHIBITOR | LA-7RD | 0.02 | 0.02 | 0.02 | 0.02 |
| | MEHQ | 0.18 | 0.18 | 0.18 | 0.18 |
| SURFACTANT | BYK-UV3500 | 0.50 | 0.50 | 0.50 | 0.50 |
| PIGMENT | PB-15:3 | 2.00 | 2.00 | 2.00 | 2.00 |
| DISPERSANT | Solsperse36000 | 0.20 | 0.20 | 0.20 | 0.20 |
| TOTAL | | 100.00 | 100.00 | 100.00 | 100.00 |
| EVALUATION RESULT | VISCOSITY | A | AA | B | A |
| | ODOR | A | A | A | A |
| | CURING PROPERTY | A | A | B | A |
| | ADHESIVE PROPERTY | A | A | A | A |
| | STORAGE STABILITY | A | A | A | A |

TABLE 3

| | | EXAMPLE 27 | EXAMPLE 28 | EXAMPLE 29 | EXAMPLE 30 | EXAMPLE 31 |
|---|---|---|---|---|---|---|
| VINYL METHYL OXAZOLIDINONE | VMOX | 20.00 | 20.00 | 20.00 | 20.00 | 20.00 |
| MONOMER HAVING PLURALITY OF VINYL ETHER GROUPS | DVE-2 | — | — | — | — | — |
| | DVE-3 | 15.00 | 15.00 | 15.00 | 15.00 | 15.00 |
| | CHDM-di | — | — | — | — | — |
| MONOMER OF FORMULA (1) | VEEA | 32.00 | 32.00 | 27.00 | 27.00 | 30.00 |
| MONOFUNCTIONAL (METH)ACRYLATE MONOMER HAVING AROMATIC GROUP | PHEA | — | 5.00 | 20.00 | 20.00 | 20.00 |
| MONOFUNCTIONAL (METH)ACRYLATE MONOMER HAVING ALICYCLIC STRUCTURE | IBXA | — | 5.00 | — | — | — |
| | TMCHA | — | — | — | — | — |
| MONOFUNCTIONAL (METH)ACRYLATE MONOMER HAVING CYCLIC ETHER STRUCTURE | CTFA | — | 5.00 | — | — | — |
| | MEDOL-10 | — | — | — | — | — |
| MONOFUNCTIONAL (METH)ACRYLATE MONOMER HAVING CROSS-LINKED CONDENSED RING STRUCTURE | FA-512AS | 20.00 | 5.00 | — | — | — |
| MONOFUNCTIONAL MONOMER OF OTHER POLYMERIZABLE COMPOUNDS | nVC | — | — | — | — | — |
| | ACMO | — | — | — | — | — |
| POLYFUNCTIONAL MONOMER OF OTHER POLYMERIZABLE COMPOUNDS | TPGDA | — | — | — | 5.00 | — |
| | NPG(2PO)DA | — | — | 5.00 | — | — |
| OLIGOMER OF OTHER POLYMERIZABLE COMPOUNDS | EC6101 | — | — | — | — | 2.00 |
| | CN9893 | — | — | — | — | — |
| PHOTOPOLYMERIZATION INITIATOR | Omnirad 819 | 4.00 | 4.00 | 4.00 | 4.00 | 4.00 |
| | SpeedcureTPO | 4.00 | 4.00 | 4.00 | 4.00 | 4.00 |
| | SpeedcureDETX | 2.00 | 2.00 | 2.00 | 2.00 | 2.00 |
| FLUORESCENT WHITENING AGENT | TELALUX OB | 0.10 | 0.10 | 0.10 | 0.10 | 0.10 |
| | TELALUX KCB | — | — | — | — | — |
| POLYMERIZATION INHIBITOR | LA-7RD | 0.02 | 0.02 | 0.02 | 0.02 | 0.02 |
| | MEHQ | 0.18 | 0.18 | 0.18 | 0.18 | 0.18 |
| SURFACTANT | BYK-UV3500 | 0.50 | 0.50 | 0.50 | 0.50 | 0.50 |
| PIGMENT | PB-15:3 | 2.00 | 2.00 | 2.00 | 2.00 | 2.00 |
| DISPERSANT | Solsperse36000 | 0.20 | 0.20 | 0.20 | 0.20 | 0.20 |
| TOTAL | | 100.00 | 100.00 | 100.00 | 100.00 | 100.00 |
| EVALUATION RESULT | VISCOSITY | B | A | B | A | B |
| | ODOR | B | A | A | A | A |
| | CURING PROPERTY | A | A | A | A | A |
| | ADHESIVE PROPERTY | A | A | A | A | AA |
| | STORAGE STABILITY | A | A | A | A | A |

| | | EXAMPLE 32 | EXAMPLE 33 | EXAMPLE 34 | COMPARATIVE EXAMPLE 1 |
|---|---|---|---|---|---|
| VINYL METHYL OXAZOLIDINONE | VMOX | 20.00 | 20.00 | 20.00 | — |
| MONOMER HAVING PLURALITY OF VINYL ETHER GROUPS | DVE-2 | — | — | — | — |
| | DVE-3 | 15.00 | 15.00 | 15.00 | 15.00 |
| | CHDM-di | — | — | — | — |
| MONOMER OF FORMULA (1) | VEEA | 31.00 | 28.00 | 32.00 | 32.00 |
| MONOFUNCTIONAL (METH)ACRYLATE MONOMER HAVING AROMATIC GROUP | PHEA | 20.00 | 20.00 | 20.00 | 40.00 |
| MONOFUNCTIONAL (METH)ACRYLATE MONOMER HAVING ALICYCLIC STRUCTURE | IBXA | — | — | — | — |
| | TMCHA | — | — | — | — |
| MONOFUNCTIONAL (METH)ACRYLATE MONOMER HAVING CYCLIC ETHER STRUCTURE | CTFA | — | — | — | — |
| | MEDOL-10 | — | — | — | — |
| MONOFUNCTIONAL (METH)ACRYLATE MONOMER HAVING CROSS-LINKED CONDENSED RING STRUCTURE | FA-512AS | — | — | — | — |
| MONOFUNCTIONAL MONOMER OF OTHER POLYMERIZABLE COMPOUNDS | nVC | — | — | — | — |
| | ACMO | — | — | — | — |
| POLYFUNCTIONAL MONOMER OF OTHER POLYMERIZABLE COMPOUNDS | TPGDA | — | — | — | — |
| | NPG(2PO)DA | — | 2.00 | — | — |
| OLIGOMER OF OTHER POLYMERIZABLE COMPOUNDS | EC6101 | — | 2.00 | — | — |
| | CN9893 | 1.00 | — | — | — |
| PHOTOPOLYMERIZATION INITIATOR | Omnirad 819 | 4.00 | 4.00 | 4.00 | 4.00 |
| | SpeedcureTPO | 4.00 | 4.00 | 4.00 | 4.00 |
| | SpeedcureDETX | 2.00 | 2.00 | 2.00 | 2.00 |

TABLE 3-continued

|  |  |  |  |  |  |
|---|---|---|---|---|---|
| FLUORESCENT WHITENING AGENT | TELALUX OB | 0.10 | 0.10 | — | 0.10 |
|  | TELALUX KCB | — | — | 0.10 | — |
| POLYMERIZATION INHIBITOR | LA-7RD | 0.02 | 0.02 | 0.02 | 0.02 |
|  | MEHQ | 0.18 | 0.18 | 0.18 | 0.18 |
| SURFACTANT | BYK-UV3500 | 0.50 | 0.50 | 0.50 | 0.50 |
| PIGMENT | PB-15:3 | 2.00 | 2.00 | 2.00 | 2.00 |
| DISPERSANT | Solsperse36000 | 0.20 | 0.20 | 0.20 | 0.20 |
| TOTAL |  | 100.00 | 100.00 | 100.00 | 100.00 |
| EVALUATION RESULT | VISCOSITY | B | C | A | C |
|  | ODOR | A | A | A | A |
|  | CURING PROPERTY | A | A | A | A |
|  | ADHESIVE PROPERTY | A | AA | A | D |
|  | STORAGE STABILITY | A | A | A | A |

|  |  | COMPARATIVE EXAMPLE 2 | COMPARATIVE EXAMPLE 3 | COMPARATIVE EXAMPLE 4 |
|---|---|---|---|---|
| VINYL METHYL OXAZOLIDINONE | VMOX | 20.00 | — | — |
| MONOMER HAVING PLURALITY OF VINYL ETHER GROUPS | DVE-2 | — | — | — |
|  | DVE-3 | — | 15.00 | 15.00 |
|  | CHDM-di | — | — | — |
| MONOMER OF FORMULA (1) | VEEA | 32.00 | 32.00 | 32.00 |
| MONOFUNCTIONAL (METH)ACRYLATE MONOMER HAVING AROMATIC GROUP | PHEA | 20.00 | 20.00 | 30.00 |
| MONOFUNCTIONAL (METH)ACRYLATE MONOMER HAVING ALICYCLIC STRUCTURE | IBXA | — | — | — |
|  | TMCHA | — | — | — |
| MONOFUNCTIONAL (METH)ACRYLATE MONOMER HAVING CYCLIC ETHER STRUCTURE | CTFA | — | — | — |
|  | MEDOL-10 | — | — | — |
| MONOFUNCTIONAL (METH)ACRYLATE MONOMER HAVING CROSS-LINKED CONDENSED RING STRUCTURE | FA-512AS | — | — | — |
| MONOFUNCTIONAL MONOMER OF OTHER POLYMERIZABLE COMPOUNDS | nVC | — | 20.00 | — |
|  | ACMO | — | — | 10.00 |
| POLYFUNCTIONAL MONOMER OF OTHER POLYMERIZABLE COMPOUNDS | TPGDA | — | — | — |
|  | NPG(2PO)DA | 15.00 | — | — |
| OLIGOMER OF OTHER POLYMERIZABLE COMPOUNDS | EC6101 | — | — | — |
|  | CN9893 | — | — | — |
| PHOTOPOLYMERIZATION INITIATOR | Omnirad 819 | 4.00 | 4.00 | 4.00 |
|  | SpeedcureTPO | 4.00 | 4.00 | 4.00 |
|  | SpeedcureDETX | 2.00 | 2.00 | 2.00 |
| FLUORESCENT WHITENING AGENT | TELALUX OB | 0.10 | 0.10 | 0.10 |
|  | TELALUX KCB | — | — | — |
| POLYMERIZATION INHIBITOR | LA-7RD | 0.02 | 0.02 | 0.02 |
|  | MEHQ | 0.18 | 0.18 | 0.18 |
| SURFACTANT | BYK-UV3500 | 0.50 | 0.50 | 0.50 |
| PIGMENT | PB-15:3 | 2.00 | 2.00 | 2.00 |
| DISPERSANT | Solsperse36000 | 0.20 | 0.20 | 0.20 |
| TOTAL |  | 100.00 | 100.00 | 100.00 |
| EVALUATION RESULT | VISCOSITY | D | D | D |
|  | ODOR | D | A | A |
|  | CURING PROPERTY | A | A | A |
|  | ADHESIVE PROPERTY | A | A | A |
|  | STORAGE STABILITY | A | A | A |

Details of the abbreviations and the trade names used in Tables 1 to 3 are as follows.

Vinyl Methyl Oxazolidinone
  VMOX: vinyl methyl oxazolidinone, manufactured by BASF.

Monomer having a plurality of vinyl ether groups
  DVE-2: diethylene glycol divinyl ether, manufactured by BASF.
  DVE-3: triethylene glycol divinyl ether, manufactured by BASF.
  CHDM-di: 1,4-cyclohexanedimethanol divinyl ether, trade name: SR420, manufactured by Sartomer.

Monomer of Formula (1)
  VEEA: 2-(2-vinyloxyethoxy)ethyl acrylate, trade name, manufactured by Nippon Shokubai Co., Ltd.

Monofunctional (Meth)Acrylate Monomer Having an Aromatic Group
  PHEA: phenoxyethyl acrylate, trade name: Viscoat #192, manufactured by Osaka Organic Chemical Industry Ltd.

Monofunctional (Meth)Acrylate Monomer Having an Alicyclic Structure
  IBXA: isobornyl acrylate, manufactured by Osaka Organic Chemical Industry Ltd.
  TMCHA: 3,3,5-trimethylcyclohexyl acrylate, manufactured by Osaka Organic Chemical Industry Ltd.

Monofunctional (Meth)Acrylate Monomer Having a Cyclic Ether Structure
  CTFA: cyclic trimethylolpropane formal acrylate, trade name: Viscoat #200, manufactured by Osaka Organic Chemical Industry Ltd.
  MEDOL-10: (2-methyl-2-ethyl-1,3-dioxlane-4-yl)methyl acrylate, trade name, manufactured by Osaka Organic Chemical Industry Ltd.

Monofunctional (Meth)Acrylate Monomer Having a Cross-Linked Condensed Ring Structure
　　FA-512AS: dicyclopentenyloxyethyl acrylate, manufactured by Hitachi Chemical Co., Ltd.
Monofunctional Monomer of Other Polymerizable Compounds
　　nVC: N-vinylcaprolactam, manufactured by ISP Japan, Ltd.
　　ACMO: acryloylmorpholine, manufactured by KJ Chemicals Corp.
Polyfunctional Monomer of Other Polymerizable Compounds
　　TPGDA: tripropylene glycol diacrylate, trade name: Viscoat #310HP, manufactured by Osaka Organic Chemical Industry Ltd.
　　NPG(2PO)DA: propoxylated (2) neopentyl glycol diacrylate, trade name: SR9003, manufactured by Sartomer.
Oligomer of Other Polymerizable Compounds
　　EC6101: aliphatic urethane acrylate oligomer, trade name: ETERCURE (registered trademark) 6101, manufactured by Eternal Materials Co., Ltd.
　　CN9893: aliphatic urethane acrylate oligomer, trade name, manufactured by Sartomer.
Photopolymerization Initiator
　　Omnirad 819: trade name, bis(2,4,6-trimethylbenzoyl)-phenylphosphine oxide, manufactured by IGM RESINS B.V.
　　Speedcure TPO: trade name, 2,4,6-trimethylbenzoyldiphenylphosphine oxide, Lambson Group Ltd.
　　Speedcure (registered trademark) DETX: trade name, 2,4-diethylthioxanthone, Lambson Group Ltd.
Fluorescent Whitening Agent
　　TELALUX (registered trademark) OB: (2,5-bis(5-tert-butyl-2-benzoxazolyl)thiophene), trade name, manufactured by Clariant (Japan) K.K.
　　TELALUX (registered trademark) KCB: (1,4-bis(2-benzoxazolyl)naphthalene), trade name, manufactured by Clariant (Japan) K.K.
Polymerization Inhibitor
　　LA-7RD: 4-hydroxy-2,2,6,6-tetramethylpyperidinyl-1-oxyl, trade name: Adekastab (registered trademark) LA-7RD, manufactured by ADEKA Corp.
　　MEHQ: 4-methoxyphenol, manufactured by Kanto Chemical Co., Inc.
Surfactant
　　BYK-UV3500: silicone-based surfactant, trade name, manufactured by BYK Additives & Instruments.
Pigment
　　PB-15:3: C.I. Pigment Blue 15:3, manufactured by Clariant (Japan) K.K.
Dispersant
　　Solsperse (registered trademark) 36000: trade name, manufactured by Lubrizol.

In the ink of Example 1, as the monomer having a plurality of vinyl ether groups, DVE-3 was used, as the monomer of the formula (1), VEEA was used, and as the monofunctional (meth)acrylate, PHEA having an aromatic group was used.

In the ink of Example 2, based on the composition of the ink of Example 1, the amount of VMOX was increased, and the amounts of VEEA and PHEA were decreased.

In the ink of Example 3, based on the composition of the ink of Example 2, the amount of VMOX was increased, and the amount of PHEA was decreased.

In the ink of Example 4, based on the composition of the ink of Example 1, the amount of VMOX was decreased, and the amount of PHEA was increased.

In the ink of Example 5, based on the composition of the ink of Example 4, the amount of VMOX was decreased, and the amount of PHEA was increased.

In the ink of Example 6, based on the composition of the ink of Example 1, DVE-3 was changed to DVE-2.

In the ink of Example 7, based on the composition of the ink of Example 1, DVE-3 was changed to CHDM-di.

In the ink of Example 8, based on the composition of the ink of Example 1, as the monomer having a plurality of vinyl ether groups, DVE-2, DVE-3, and CHDM-di were used together in combination.

In the ink of Example 9, based on the composition of the ink of Example 1, the amount of DVE-3 was increased, and the amount of VEEA was decreased.

In the ink of Example 10, based on the composition of the ink of Example 9, the amount of DVE-3 was increased, and the amount of VEEA was decreased.

In the ink of Example 11, based on the composition of the ink of Example 1, the amount of DVE-3 was decreased, and NPG(2PO)DA, which was the polyfunctional monomer of the other polymerizable compounds, was used in an amount corresponding to the decreased amount of DVE-3.

In the ink of Example 12, based on the composition of the ink of Example 11, the amount of DVE-3 was decreased, and the amount of NPG(2PO)DA was increased.

In the ink of Example 13, based on the composition of the ink of Example 11, the amounts of DVE-3 and PHEA were increased, and the amount of VEEA was decreased.

In the ink of Example 14, based on the composition of the ink of Example 13, VEEA was not used, and the amounts of VMOX and DVE-3 were increased.

In the ink of Example 15, based on the composition of the ink of Example 1, the amounts of VMOX, DVE-3, and PHEA were decreased, and the amount of VEEA was increased.

In the ink of Example 16, based on the composition of the ink of Example 15, the amount of VMOX was decreased, and the amount of VEEA was increased.

In the ink of Example 17, based on the composition of the ink of Example 15, the amounts of VMOX and DVE-3 were increased, and the amounts of VEEA and PHEA were decreased.

In the ink of Example 18, based on the composition of the ink of Example 15, the amounts of VMOX and VEEA were decreased, and the amounts of DVE-3 and PHEA were increased.

In the ink of Example 19, based on the composition of the ink of Example 1, as the monofunctional (meth)acrylate, IBXA having an alicyclic structure was used.

In the ink of Example 20, based on the composition of the ink of Example 19, the amount of VMOX was increased, and the amount of IBXA was decreased.

In the ink of Example 21, based on the composition of the ink of Example 19, the amounts of VMOX and VEEA were decreased, and the amount of IBXA was increased.

In the ink of Example 22, based on the composition of the ink of Example 1, as the monofunctional (meth)acrylate, TMCHA having an alicyclic structure was used.

In the ink of Example 23, based on the composition of the ink of Example 1, as the monofunctional (meth)acrylate, CTFA having a cyclic ether structure was used.

In the ink of Example 24, based on the composition of the ink of Example 23, the amount of VMOX was increased, and the amount of CTFA was decreased.

In the ink of Example 25, based on the composition of the ink of Example 23, the amounts of VMOX and VEEA were decreased, and the amount of CTFA was increased.

In the ink of Example 26, based on the composition of the ink of Example 1, as the monofunctional (meth)acrylate, MEDOL-10 having a cyclic ether structure was used.

In the ink of Example 27, based on the composition of the ink of Example 1, as the monofunctional (meth)acrylate, FA-512AS having a cross-linked condensed ring structure was used.

In the ink of Example 28, based on the composition of the ink of Example 27, the amount of FA-512AS was decreased, and PHEA, IBXA, and CTFA were used together in combination.

In the ink of Example 29, based on the composition of the ink of Example 11, the amount of DVE-3 was increased, and the amounts of VEEA and NPG(2PO)DA were decreased.

In the ink of Example 30, based on the composition of the ink of Example 29, NPG(2PO)DA was changed to TPGDA.

In the ink of Example 31, based on the composition of the ink of Example 1, the amount of VEEA was decreased, and EC6101, which was the oligomer of the other polymerizable compounds, was used in an amount corresponding to the decreased amount of VEEA.

In the ink of Example 32, based on the composition of the ink of Example 1, the amount of VEEA was decreased, and CN9893, which was the oligomer of the other polymerizable compounds, was used in an amount corresponding to the decreased amount of VEEA.

In the ink of Example 33, based on the composition of the ink of Example 1, the amount of VEEA was decreased, and NPG(2PO)DA and EC6101 were used in an amount corresponding to the decreased amount of VEEA.

In the ink of Example 34, based on the composition of the ink of Example 1, the fluorescent whitening agent was changed from TELALUX OB to TELALUX KCB.

In the ink of Comparative Example 1, based on the composition of the ink of Example 1, VMOX was not used, and the amount of PHEA was increased.

In the ink of Comparative Example 2, based on the composition of the ink of Example 1, DVE-3 was not used, and NPG(2PO)DA was used in an amount corresponding to the decreased amount of DVE-3.

In the ink of Comparative Example 3, based on the composition of the ink of Comparative Example 1, the amount of PHEA was decreased, and nVC, which was the monofunctional monomer of the other polymerizable compounds, was used in an amount corresponding to the decreased amount of PHEA.

In the ink of Comparative Example 4, based on the composition of the ink of Comparative Example 1, the amount of PHEA was decreased, and ACMO, which was the monofunctional monomer of the other polymerizable compounds, was used in an amount corresponding to the decreased amount of PHEA.

7.2. Evaluation

The following evaluations were performed on the inks of Examples and Comparative Examples, and the results thereof are shown in the columns of evaluation results of Tables 1 to 3.

7.2.1. Viscosity of Ink

By the measurement method of the viscosity of the ink described above, a viscosity of the ink at 25° C. was measured within one hour after the ink preparation and was then evaluated in accordance with the following evaluation criteria. In addition, the viscosity of the ink of this evaluation was regarded as an initial viscosity of the ink in the following storage stability evaluation.

Evaluation Criteria
AA: Viscosity of 15 mPa·s or less.
A: Viscosity of more than 15 to 20 mPa·s.
B: Viscosity of more than 20 to 25 mPa·s.
C: Viscosity of more than 25 to 30 mPa·s.
D: Viscosity of more than 30 mPa·s.

7.2.2. Odor of Coating Film

By using a bar coater, the ink was applied on a recording medium to have a thickness of 10 μm. For the recording medium, as a poly(vinyl chloride) film, JT5829R, trade name, manufactured by MACtac was used. Next, by using an UV-LED, radiation rays were emitted to a coating film of the ink at an energy of 400 mJ/cm$^2$. Subsequently, an odor generated from the coating film was tested by a sensory evaluation in an environment at approximately 25° C., and evaluation was performed in accordance with the following criteria.

Evaluation Criteria
A: No odor or slightly sensed odor.
B: weak odor, the source of which is recognized.
C: easily sensed odor.
D: strong odor or unfavorable odor.

7.2.3. Curing Property of Ink

First, the ink was printed on a recording medium by an ink jet method. In particular, as the recording medium, JT5829R, a poly(vinyl chloride) film, manufactured by MACtac was used. As an ink jet apparatus, an ink jet printer, PX-G930, manufactured by Seiko Epson Corporation, was used. A printing pattern of the ink was a solid image at a recording resolution of 600 dpi (dots per inch) by 600 dpi. The printer was modified so that a plastic film was used as the recording medium and a radiation curable ink was ejected.

Next, the curing property of the ink applied to the recording medium was evaluated. In particular, by using an UV-LED having a peak wavelength of 395 nm as a light source device, the ink on the recording medium was irradiated by changing emission energy. In addition, an emission energy at which the ink became tack-free and formed a coating film was investigated. Emission energy necessary to enable the ink to be tack-free was evaluated in accordance with the following evaluation criteria.

Evaluation Criteria
A: emission energy of less than 200 mJ/cm$^2$.
B: emission energy of 200 to less than 350 mJ/cm$^2$.
C: emission energy of 350 to less than 500 mJ/cm$^2$.
D: emission energy of 500 mJ/cm$^2$ or more.

7.2.4. Adhesive Property of Coating Film

In a manner similar to that of the above evaluation of the curing property of the ink, the ink was applied on JT5829R which was a poly(vinyl chloride) film. Next, by using the above UV-LED, a coating film was formed at an emission energy of 400 mJ/cm$^2$. A cross-cut test was performed on the coating film thus obtained in accordance with JIS K5600-5-6, and an adhesive property between the coating film and the recording medium was evaluated.

In particular, using a cutter as a cutting tool, a plurality of cutting lines was formed in the coating film by bringing a blade of the cutter into contact with the coating film at an angle orthogonal thereto. The cutting was performed so that cutting lines adjacent to each other were located at 1 mm-intervals, so that a lattice having 10×10 squares was formed. A transparent adhesive tape having a length of 75 mm and a width of 25 mm was adhered to the lattice and was then sufficiently rubbed and pressed with fingers so as to remove air voids present between the tape and the coating film. Subsequently, within five minutes after the above tape was adhered, one end portion of the tape was lifted so that an angle between the tape and a coating film surface was approximately 60°, and within 0.5 to 1.0 second, the tape described above was then quickly peeled away from the coating film. Next, a peeling condition of the coating film was observed by visual inspection and was evaluated in accordance with the following evaluation criteria.

Evaluation Criteria
AA: No peeling of the coating film is observed in the lattice.
A: Peeling of the coating film is observed in less than 10% of the lattice.
B: Peeling of the coating film is observed in 10% to less than 35% of the lattice.
C: Peeling of the coating film is observed in 35% to less than 50% of the lattice.
D: Peeling of the coating film is observed in 50% or more of the lattice.

7.2.5. Storage Stability of Ink

As an index of the storage stability of the ink, a change in viscosity of the ink after the ink was left at 60° C. for 14 days was investigated. In particular, after the ink was received in a brown glass bottle having a volume of 30 ml, this glass bottle was tightly sealed and was placed in a constant-temperature bath controlled at 60° C. for 14 days. Subsequently, after the glass bottle was recovered from the constant-temperature bath and then spontaneously cooled to 25° C., the viscosity of the ink was measured by the method described above and was regarded as the viscosity of the ink thus left. A rate of change of the viscosity of the ink thus left with respect to the initial viscosity of the ink was calculated and then evaluated in accordance with the following evaluation criteria.

Evaluation Criteria
A: Rate of change in viscosity is less than 5%.
B: Rate of change in viscosity is 5% to less than 10%.
C Rate of change in viscosity is 10% or more.

7.2.6. Comprehensive Evaluation Result

As shown in Tables 1, 2, and 3, the viscosities of the inks of Examples other than Examples 11, 12, 14, and 33 were evaluated as B corresponding to Good or more. In particular, the results of Examples 3, 17, 20, and 24 were evaluated as AA corresponding to Excellent. The results of Examples 11, 12, 14, and 33 were evaluated as C corresponding to Fair. In addition, the adhesive properties of the coating films of Examples other than Examples 4 and 5 were evaluated as A corresponding to Very Good or more. In particular, the results of Examples 31 and 33 were evaluated as AA corresponding to Excellent. The result of Example 4 was evaluated as B corresponding to Good, and the result of Example 5 was evaluated as C corresponding to Fair. Accordingly, it was shown that the inks of Examples had a low viscosity and that the coating film thereof had an excellent adhesive property.

The odors of the inks of Examples other than Examples 12 and 16 were evaluated as B corresponding to Good or more, and the results of Examples 12 and 16 were evaluated as C corresponding to Fair. The curing properties of the inks of Examples other than Example 10 were evaluated as B corresponding to Good or more, and the result of Example 10 was evaluated as C corresponding to Fair. The storage stabilities of the inks of Examples other than Examples 2 and 3 were evaluated as A corresponding to Good, the result of Example 2 was evaluated as B corresponding to Fair, and the result of Example 3 was evaluated as C corresponding to No Good. From the results described above, it was shown that in the inks of Examples, the odor, the curing property, and the storage stability were likely to be improved.

On the other hand, in the inks of Comparative Examples, it was found that one of the viscosity and the adhesive property was evaluated as D corresponding to No Good, and the decrease in viscosity and the adhesive property of the coating film were not simultaneously obtained.

What is claimed is:

1. A radiation curable ink jet ink composition comprising:
   vinyl methyl oxazolidinone;
   a fluorescent whitening agent;
   a pigment; and
   a monomer having at least two vinyl ether groups;
   wherein the monomer having at least two vinyl ether groups contains at least one selected from the group consisting of ethylene glycol divinyl ether, hexanediol divinyl ether, propylene glycol divinyl ether, dipropylene glycol divinyl ether, tripropylene glycol divinyl ether, trimethylolethane trivinyl ether, trimethylolpropane trivinyl ether, glycerin trivinyl ether, ditrimethylolpropane tetravinyl ether, pentaerythritol tetravinyl ether, and dipentaerythritol pentavinyl ether.

2. The radiation curable ink jet ink composition according to claim 1, further comprising:
   a monomer represented by the following formula (1)

$$H_2C=CR^1-CO-OR^2-O-CH=CH-R^3 \quad (1)$$

where in the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

3. The radiation curable ink jet ink composition according to claim 1,
   wherein a content of the vinyl methyl oxazolidinone with respect to a total mass of the ink jet ink composition is 5 to 40 percent by mass.

4. The radiation curable ink jet ink composition according to claim 1,
   wherein a content of the monomer having at least two vinyl ether groups with respect to a total mass of the ink jet ink composition is 5 to 30 percent by mass.

5. The radiation curable ink jet ink composition according to claim 2,
   wherein a content of the monomer represented by the formula (1) with respect to a total mass of the ink jet ink composition is 10 to 50 percent by mass.

6. The radiation curable ink jet ink composition according to claim 1, further comprising:
   a monofunctional (meth)acrylate monomer.

7. The radiation curable ink jet ink composition according to claim 6,
   wherein the monofunctional (meth)acrylate monomer includes a monofunctional (meth)acrylate monomer having an aromatic group.

8. An ink jet method comprising:
   ejecting the radiation curable ink jet ink composition according to claim 1 from an ink jet head to be adhered to a recording medium; and
   emitting radiation rays to the radiation curable ink jet ink composition adhered to the recording medium.

* * * * *